US007698236B2

(12) United States Patent
Cox et al.

(10) Patent No.: US 7,698,236 B2
(45) Date of Patent: Apr. 13, 2010

(54) FUZZY LOGIC BASED VIEWER IDENTIFICATION FOR TARGETED ASSET DELIVERY SYSTEM

(75) Inventors: Earl Cox, Beverly Hills, CA (US);
Patrick M. Sheehan, Jamison, PA (US);
Alden Lloyd Peterson, II, New Providence, NJ (US)

(73) Assignee: Invidi Technologies Corporation, Princeton, NJ (US)

( * ) Notice: Subject to any disclaimer, the term of this patent is extended or adjusted under 35 U.S.C. 154(b) by 0 days.

(21) Appl. No.: 11/743,544

(22) Filed: May 2, 2007

(65) Prior Publication Data
US 2008/0059390 A1 Mar. 6, 2008

Related U.S. Application Data

(60) Provisional application No. 60/746,245, filed on May 2, 2006, provisional application No. 60/746,244, filed on May 2, 2006.

(51) Int. Cl.
*G06F 15/18* (2006.01)
(52) U.S. Cl. .............................. 706/12; 348/473; 725/40
(58) Field of Classification Search ................... 706/12; 707/3; 709/217
See application file for complete search history.

(56) References Cited

U.S. PATENT DOCUMENTS

| 4,331,974 | A | 5/1982 | Cogswell et al. |
| 4,573,072 | A | 2/1986 | Freeman |
| 4,602,279 | A | 7/1986 | Freeman |
| 4,918,516 | A | 4/1990 | Freeman |
| 5,099,319 | A | 3/1992 | Esch et al. |
| 5,155,591 | A | 10/1992 | Wachob |
| 5,231,494 | A | 7/1993 | Wachob |
| 5,260,778 | A | 11/1993 | Kauffman et al. |
| 5,283,639 | A | 2/1994 | Esch et al. |

(Continued)

FOREIGN PATENT DOCUMENTS

EP 0930784 A1 7/1999

(Continued)

OTHER PUBLICATIONS

U.S. Appl. No. 09/545,015, filed Apr. 7, 2000, Haberman.

*Primary Examiner*—David R Vincent
*Assistant Examiner*—Kalpana Bharadwaj
(74) *Attorney, Agent, or Firm*—Marsh Fischmann and Breyfogle LLP

(57) ABSTRACT

A targeted advertising system uses a machine learning tool to select an asset for a current user of a user equipment device, for example, to select an ad for delivery to a current user of a digital set top box in a cable network. The machine learning tool first operates in a learning mode to receive user inputs and develop evidence that can characterize multiple users of the user equipment device audience. In a working mode, the machine learning tool processes current user inputs to match a current user to one of the identified users of that user equipment device audience. Fuzzy logic may be used to improve development of the user characterizations, as well as matching of the current user to those developed characterizations. In this manner, targeting of assets can be implemented not only based on characteristics of a household but based on a current user within that household.

38 Claims, 22 Drawing Sheets

U.S. PATENT DOCUMENTS

| | | | |
|---|---|---|---|
| 5,381,477 A | 1/1995 | Beyers, II et al. |
| 5,410,344 A | 4/1995 | Graves |
| 5,446,919 A | 8/1995 | Wilkins |
| 5,515,098 A | 5/1996 | Carles |
| 5,515,858 A | 5/1996 | Myllymaki |
| 5,534,941 A | 7/1996 | Sie et al. |
| 5,534,944 A | 7/1996 | Egawa et al. |
| 5,537,586 A | 7/1996 | Amram et al. |
| 5,585,858 A | 12/1996 | Harper |
| 5,600,364 A | 2/1997 | Hendricks et al. |
| 5,600,366 A | 2/1997 | Schulman |
| 5,636,346 A | 6/1997 | Saxe |
| 5,652,615 A | 7/1997 | Bryant et al. |
| 5,661,516 A | 8/1997 | Carles |
| 5,661,519 A | 8/1997 | Franetzki |
| 5,682,195 A | 10/1997 | Hendricks et al. |
| 5,724,521 A | 3/1998 | Dedrick |
| 5,740,549 A | 4/1998 | Reilly et al. |
| 5,754,939 A | 5/1998 | Herz et al. |
| 5,774,170 A | 6/1998 | Hite et al. |
| 5,805,974 A | 9/1998 | Hite et al. |
| 5,818,539 A | 10/1998 | Naimpally et al. |
| 5,838,678 A | 11/1998 | Davis et al. |
| 5,848,396 A | 12/1998 | Gerace |
| 5,859,660 A | 1/1999 | Perkins et al. |
| 5,872,588 A | 2/1999 | Aras et al. |
| 5,912,709 A | 6/1999 | Takahashi |
| 5,917,830 A | 6/1999 | Chen et al. |
| 5,918,014 A | 6/1999 | Robinson |
| 5,948,061 A | 9/1999 | Merriman et al. |
| 5,982,436 A | 11/1999 | Balakrishran et al. |
| 5,991,735 A | 11/1999 | Gerace |
| 6,002,393 A | 12/1999 | Hite et al. |
| 6,029,045 A | 2/2000 | Picco et al. |
| 6,049,569 A | 4/2000 | Radha et al. |
| 6,067,303 A | 5/2000 | Aaker et al. |
| 6,088,396 A | 7/2000 | Takahashi |
| 6,088,722 A | 7/2000 | Herz et al. |
| 6,111,896 A | 8/2000 | Slattery et al. |
| 6,151,443 A | 11/2000 | Gable et al. |
| 6,154,496 A | 11/2000 | Radha |
| 6,181,334 B1 | 1/2001 | Freeman et al. |
| 6,195,368 B1 | 2/2001 | Gratacap |
| 6,204,843 B1 | 3/2001 | Freeman et al. |
| 6,208,691 B1 | 3/2001 | Balakrishnan et al. |
| 6,216,129 B1 | 4/2001 | Eldering |
| 6,246,701 B1 | 6/2001 | Slattery et al. |
| 6,252,873 B1 | 6/2001 | Vines |
| 6,269,120 B1 | 7/2001 | Boice et al. |
| 6,298,348 B1 | 10/2001 | Eldering |
| 6,324,519 B1 | 11/2001 | Eldering |
| 6,353,929 B1 | 3/2002 | Houston |
| 6,418,169 B1 | 7/2002 | Datari |
| 6,438,752 B1 | 8/2002 | McClard |
| 6,446,261 B1 | 9/2002 | Rosser |
| 6,457,010 B1 | 9/2002 | Eldering et al. |
| 6,463,585 B1 | 10/2002 | Hendricks et al. |
| 6,487,721 B1 | 11/2002 | Safadi |
| 6,560,578 B2 | 5/2003 | Eldering |
| 6,615,039 B1 | 9/2003 | Eldering |
| 6,684,194 B1 | 1/2004 | Eldering et al. |
| 6,704,930 B1 | 3/2004 | Eldering et al. |
| 6,708,335 B1 | 3/2004 | Ozer et al. |
| 6,714,917 B1 | 3/2004 | Eldering et al. |
| 6,820,277 B1 | 11/2004 | Eldering et al. |
| 7,003,792 B1 | 2/2006 | Yuen |
| 7,039,932 B2 | 5/2006 | Eldering et al. |
| 7,100,183 B2 | 8/2006 | Kunkel et al. |
| 2001/0025245 A1 | 9/2001 | Flickinger et al. |
| 2001/0032333 A1 | 10/2001 | Flickinger et al. |
| 2001/0049620 A1 | 12/2001 | Blasko |
| 2002/0013943 A1 | 1/2002 | Habermann et al. |
| 2002/0026638 A1 | 2/2002 | Eldering et al. |
| 2002/0032626 A1 | 3/2002 | DeWolf |
| 2002/0049727 A1 | 4/2002 | Rothkopf |
| 2002/0049968 A1 | 4/2002 | Wilson et al. |
| 2002/0053077 A1 | 5/2002 | Shah-Nazaroff et al. |
| 2002/0056107 A1 | 5/2002 | Schlack |
| 2002/0059584 A1 | 5/2002 | Ferman et al. |
| 2002/0072966 A1 | 6/2002 | Eldering et al. |
| 2002/0083435 A1 | 6/2002 | Blasko et al. |
| 2002/0083439 A1 | 6/2002 | Eldering et al. |
| 2002/0083441 A1 | 6/2002 | Flickinger et al. |
| 2002/0083442 A1 | 6/2002 | Eldering |
| 2002/0083443 A1 | 6/2002 | Eldering et al. |
| 2002/0083444 A1 | 6/2002 | Blasko et al. |
| 2002/0083445 A1 | 6/2002 | Flickinger et al. |
| 2002/0083451 A1 | 6/2002 | Gill et al. |
| 2002/0087973 A1 | 7/2002 | Hamilton et al. |
| 2002/0087975 A1 | 7/2002 | Schlack |
| 2002/0087980 A1 | 7/2002 | Eldering et al. |
| 2002/0092019 A1 | 7/2002 | Marcus |
| 2002/0099611 A1 | 7/2002 | De Souza et al. |
| 2002/0111154 A1 | 8/2002 | Eldering et al. |
| 2002/0111172 A1 | 8/2002 | DeWolf et al. |
| 2002/0122430 A1 | 9/2002 | Habermann et al. |
| 2002/0123928 A1 | 9/2002 | Schlack et al. |
| 2002/0129368 A1 | 9/2002 | Schlack et al. |
| 2002/0143901 A1 | 10/2002 | Lupo et al. |
| 2002/0144262 A1 | 10/2002 | Plotnick et al. |
| 2002/0144263 A1 | 10/2002 | Eldering et al. |
| 2002/0178445 A1 | 11/2002 | Eldering et al. |
| 2002/0178447 A1 | 11/2002 | Plotnick et al. |
| 2002/0184047 A1 | 12/2002 | Plotnick et al. |
| 2002/0184130 A1 | 12/2002 | Blasko |
| 2002/0194058 A1 | 12/2002 | Eldering |
| 2003/0004810 A1 | 1/2003 | Eldering |
| 2003/0005437 A1 | 1/2003 | Feuer et al. |
| 2003/0037333 A1 | 2/2003 | Ghashghai et al. |
| 2003/0045957 A1 | 3/2003 | Habermann et al. |
| 2003/0067554 A1 | 4/2003 | Klarfeld et al. |
| 2003/0093792 A1 | 5/2003 | Labeeb et al. |
| 2003/0097299 A1 | 5/2003 | O'Kane |
| 2003/0101454 A1 | 5/2003 | Ozer et al. |
| 2003/0105831 A1 | 6/2003 | O'Kane et al. |
| 2003/0110171 A1 | 6/2003 | Ozer et al. |
| 2003/0115318 A1 | 6/2003 | Wueste |
| 2003/0142689 A1 | 7/2003 | Habermann et al. |
| 2003/0149975 A1 | 8/2003 | Eldering et al. |
| 2003/0200336 A1 | 10/2003 | Pal et al. |
| 2003/0220100 A1 | 11/2003 | McElhatten et al. |
| 2004/0003118 A1 | 1/2004 | Brown et al. |
| 2004/0003398 A1 | 1/2004 | Donian et al. |
| 2004/0015984 A1 | 1/2004 | Yamamoto et al. |
| 2004/0015986 A1 | 1/2004 | Carver et al. |
| 2004/0045020 A1 | 3/2004 | Witt et al. |
| 2004/0117257 A1 | 6/2004 | Habermann |
| 2004/0181818 A1 | 9/2004 | Heyner et al. |
| 2004/0220893 A1 | 11/2004 | Spivack et al. |
| 2004/0243470 A1 | 12/2004 | Ozer et al. |
| 2004/0243623 A1 | 12/2004 | Ozer et al. |
| 2005/0021398 A1 | 1/2005 | McCleskey et al. |
| 2005/0028207 A1 | 2/2005 | Finseth et al. |
| 2005/0080846 A1 | 4/2005 | McCleskey et al. |
| 2005/0097599 A1 | 5/2005 | Plotnick et al. |
| 2005/0193410 A1 | 9/2005 | Eldering et al. |
| 2005/0228806 A1 | 10/2005 | Haberman |
| 2005/0234992 A1 | 10/2005 | Haberman |
| 2006/0212904 A1* | 9/2006 | Klarfeld et al. ............ 725/46 |
| 2007/0239675 A1* | 10/2007 | Ragno et al. ............ 707/3 |

| | | | | | |
|---|---|---|---|---|---|
| 2007/0261072 A1 * | 11/2007 | Boulet et al. ................. 725/14 | WO | 00/33228 A1 | 6/2000 |
| | | | WO | 00/33233 A1 | 6/2000 |
| | FOREIGN PATENT DOCUMENTS | | WO | 01/17250 A1 | 3/2001 |
| WO | 99/21338 A1 | 4/1999 | WO | 01/47156 A2 | 6/2001 |
| WO | 9946708 | 9/1999 | | | |
| WO | 0017775 | 3/2000 | * cited by examiner | | |

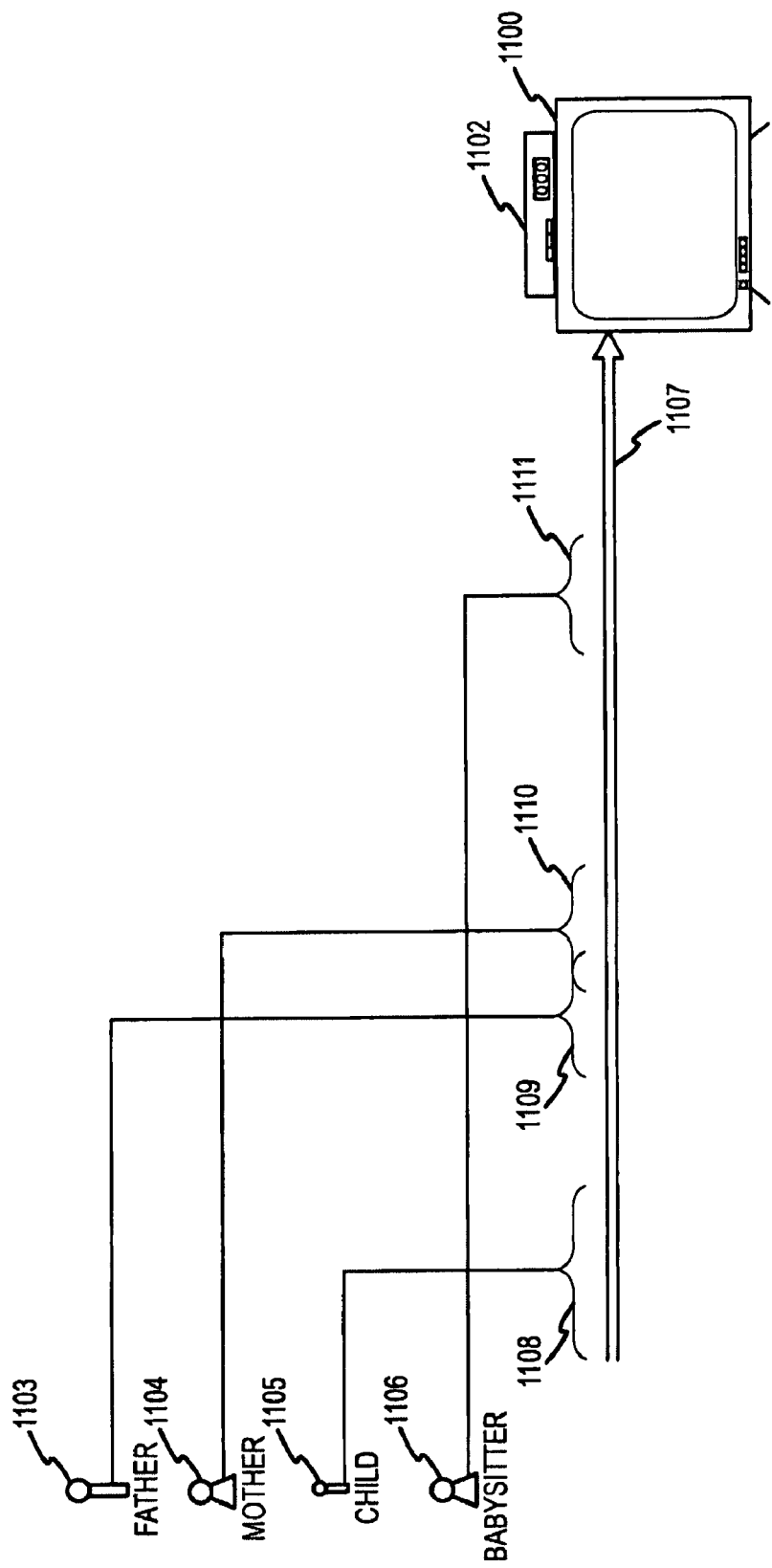

US 7,698,236 B2

FUZZY LOGIC BASED VIEWER IDENTIFICATION FOR TARGETED ASSET DELIVERY SYSTEM

CROSS-REFERENCE TO RELATED APPLICATION

This application claims priority under 35 U.S.C. 119 to U.S. Provisional Application No. 60/746,245, entitled, "A METHOD AND SYSTEM FOR DISCOVERING THE INDIVIDUAL VIEWERS OF A TELEVISION AUDIENCE (ALONG WISH THEIR ATTRIBUTES, AND BEHAVIOR) AND USING THIS INFORMATION TO ACCURATELY SELECT AND INSERT CANDIDATE ADS IN REAL-TIME FOR ACTIVELY WATCHING VIEWERS," filed on May 2, 2006, and U.S. Provisional Application No. 60/746,244, entitled "METHOD AND APPARATUS TO PERFORM REAL-TIME ESTIMATION AND COMMERCIAL SELECTION SUITABLE FOR TARGETED ADVERTISING," filed on May 2, 2006. The contents of both of these applications are incorporated herein as if set forth in full.

FIELD OF INVENTION

The present invention relates generally to targeted delivery of assets, such as advertisements or other content, in a communications network. In particular, the invention relates to identifying a current network user and matching assets to the user.

BACKGROUND OF THE INVENTION

Broadcast network content or programming is commonly provided in conjunction with associated informational content or assets. These assets include advertisements, associated programming, public-service announcements, ad tags, trailers, weather or emergency notifications and a variety of other content, including paid and unpaid content. In this regard, asset providers (e.g., advertisers) who wish to convey information (e.g., advertisements or "ads") regarding services and/or products to users of the broadcast network often pay for the right to insert their information into programming of the broadcast network. For instance, advertisers may provide ad content to a network operator such that the ad content may be interleaved with broadcast network programming during one or more programming breaks. The delivery of such paid assets often subsidizes or covers the costs of the programming provided by the broadcast network. This may reduce or eliminate costs borne by the users of the broadcast network programming.

In order to achieve a better return on their investment, asset providers often try to target their assets to a selected audience that is deemed likely to be interested in the goods or services of the asset provider. The case of advertisers on a cable television network is illustrative. For instance, an advertiser or a cable television network may target its ads to certain demographic groups based on, for example, geographic location, gender, age, income etc. Accordingly, once an advertiser has created an ad that is targeted to a desired group of viewers (e.g., targeted group) the advertiser may attempt to procure insertion times in the network programming when the targeted group is expected to be among the audience of the network programming.

More recently, it has been proposed to target assets to individual households. This would allow asset providers to better target audience segments of interest or to tailor messages to different audience segments. However, targeting households is problematic. Again, the case of a cable television network is illustrative. It is often possible to obtain audience classification information for a household based on name or address information. For example, information based on credit card transactions or other financial transactions may be available from third party databases. However, information based on an identified household does not always ensure appropriate targeting of assets. In the case of a family household, for example, a current network user might be a mother, a father, a child, a babysitter, etc. Additionally, where the matching of ads to households is performed in the network, some mechanism is required to target the selected ads to the appropriate households. This is difficult in broadcast networks. Accordingly, household-based targeting, while an improvement over untargeted asset delivery or conventional ratings-based asset targeting in a broadcast network, still entails significant obstacles and/or targeting uncertainty.

SUMMARY OF THE INVENTION

It has been recognized that the effectiveness of asset targeting can be enhanced by identifying a current network user, e.g., determining demographic or other classification parameters of a putative current network user or users. This would ideally allow an asset targeting system to distinguish between different potential users of a single household, as well as identifying unknown users, such that appropriate targeting of assets can be executed.

The present invention enables such functionality in the context of asset delivery in communications networks, including cable television networks. Moreover, such functionality can be executed transparently, from the perspective of the network user, based on monitoring ordinary network usage activities, for example, as indicated by a click stream of a remote control. Moreover, the present invention allows such functionality to be implemented in substantially real-time, using limited processing resources. Thus, for example, the user identification functionality can be executed by an application running on a conventional digital set top box. The invention also provides a mechanism for signaling the network in relation to the user identification process, for example, to enhance selection of assets for insertion into network content streams or to report information for evaluating size and composition of the audience actually reached.

In accordance with one aspect of the present invention, a method and apparatus ("utility") is provided that uses machine learning, e.g., fuzzy logic, to match assets to current users. Specifically, the utility involves identifying an asset having a target audience defined by one or more targeting parameters and matching the identified asset to a current user of a user equipment device using a machine learning system. The targeting parameters may define certain demographic values of a target audience of a television commercial. The machine learning system preferably involves identifying classification parameters of at least one user based on evidence aggregated from user inputs collected in a learning mode. These inputs may, for example, be analyzed based on correlated programming information, or based on programming independent characteristics, e.g., volume settings or quickness of the click process.

Fuzzy logic may be used to match assets to current users. The fuzzy logic used to match the asset to the current user may involve either or both of fuzzy sets and fuzzy rules. For example, the noted matching may involve using fuzzy logic to identify a number of discrete users in an audience (e.g., number of members of a household) and/or to determine one or more classification parameters of a user or users. This may be based on user inputs such as a click stream of a remote control. Thus, user inputs may be monitored and associated with values related to the classification parameter(s). These values can then be treated as points in a fuzzy set. In one implementation, the matching function involves monitoring a number of user inputs to aggregate points in a fuzzy set. This matching may involve multiple dimensions related to multiple classification parameters (e.g., age, gender, income, etc.), and the aggregated points may be used to define one or more features of a multidimensional feature terrain. The feature terrain may be processed to remove noise and to reduce the set of gradients in the terrain, for example, by clustering features. The remaining features of the processed feature terrain can then be used to identify each user in an audience and determine one or more classification parameters for each user. Similar processing can be used to identify viewing patterns as a function of time (periodicity). For example, different terrains can be developed for different time periods, e.g., different times of day.

Additionally or alternatively, fuzzy logic may be used to develop a characterization of a target audience of a network programming event. For example, the target audience of an asset may be defined by a demographic profile including a number of demographic parameter values. These values may be associated with a series of fuzzy numbers or fuzzy sets. An additional implementation of fuzzy logic may be used to correlate the fuzzy numbers with classification parameters of putative user. For example, a congruent similarity function may be used to match the audience characterization or targeting parameters to the classification parameters. Similar processing can be used to match a periodicity pattern to an identified user. Alternatively, where different terrains are developed for different times, as noted above, such periodicity is reflected in the terrains; that is, time becomes a dimension of the terrain set. A match may be determined based on a combination of the degree of correlation of the user classification parameters to the ad targeting parameters and the likelihood that an appropriate viewer will be watching at the time of the ad delivery. The resulting match may be used to "vote" for assets to be inserted into content streams of the network to select ads for delivery and/or to report a "goodness of fit" of a user receiving the asset to the asset targeting parameters. The noted utility may also be operative to determine whether the user equipment device is "on" and to determine whether any user is present at the user equipment device. The user inputs or click stream data can be processed at the user equipment device or at another location, e.g., raw or preprocessed click stream data may be transmitted to a head end for processing to determine classification parameter information. For example, this may be done where messaging bandwidth is sufficient and user equipment device resources are limited.

In one implementation, the machine learning system may be a substantially unsupervised system. That is, the system can accumulate evidence and thereby learn a composition of a user set, such as a viewing audience, without requiring a training process in which the system is provided knowledge about or examples of usage (e.g., viewing) patterns. In this manner, the system can readily adapt to changes, e.g., changes in the viewing audience or viewing audience demographics due to, for example, additions to or departures from the household, changing demographics due to aging, change of income, etc., addition of a television set (e.g., in a child's room) that impacts viewership, etc. Moreover, the system can operate substantially autonomously, thereby substantially avoiding the need for any supervised set-up or retraining process.

In accordance with another aspect of the present invention, functionality for identifying a user can be executed at a user equipment device. It has been recognized that a current user can be effectively identified based on analysis of user inputs at a user equipment device. An associated utility in accordance with the present invention involves receiving user inputs at the user equipment device and analyzing the inputs to associate audience classification parameters with the user using a machine learning system. For example, the inputs may relate to a click stream of a remote control device reflecting program selections, volume control inputs and the like. The machine learning system is preferably capable of learning in a substantially unsupervised fashion. Fuzzy logic can be used to analyze these inputs on an individual basis to obtain evidence concerning the classification parameters of the user. This evidence can then be aggregated and analyzed using fuzzy logic to determine classification parameters of a user.

In accordance with a still further aspect of the present invention, a current user of a communications network can be identified without requiring persistent storage of user profiles. This is advantageous in a number of respects. First, because a persistent profile is not required, any privacy concerns are reduced. Additionally, because a persistent profile is not required to make identifications, the system is effective not only to identify known users but also to identify unknown users. Moreover, the system is adapted to quickly converge on classification parameters based on contemporaneous user inputs such that errors due to user changes are reduced. An associated utility involves developing a model of a network user based on user inputs free from persistent storage of a profile of the user and using the model of the network user in targeting assets to the user. In this regard, recent user inputs may be analyzed using machine learning, e.g., involving fuzzy logic, to determine classification parameters of a current user.

In accordance with another aspect of the present invention, a user equipment device is operative to signal a broadcast network regarding a user of the device. An associated utility involves determining, at the user equipment device, user information regarding the user of the device based at least in part on user inputs to the device, and signaling the broadcast network based on user information. For example, the user information may include classification parameters of the user. The signals transmitted to the broadcast network may reflect the results of a matching process whereby user classification information is compared to targeting information for an asset. In this regard, the information transmitted across the network need not include any classification information regarding the user. Such signaling information may be used, for example, to vote for assets to be inserted into network content streams or to report information regarding assets actually delivered at the user equipment device, e.g., for measuring the size and/or composition of the audience.

BRIEF DESCRIPTION OF THE DRAWINGS

FIG. 7A illustrates an example of CPEs that include a television set and a Digital Set Top Box (DSTB) as used by a plurality of users.

DETAILED DESCRIPTION

Figure 1:
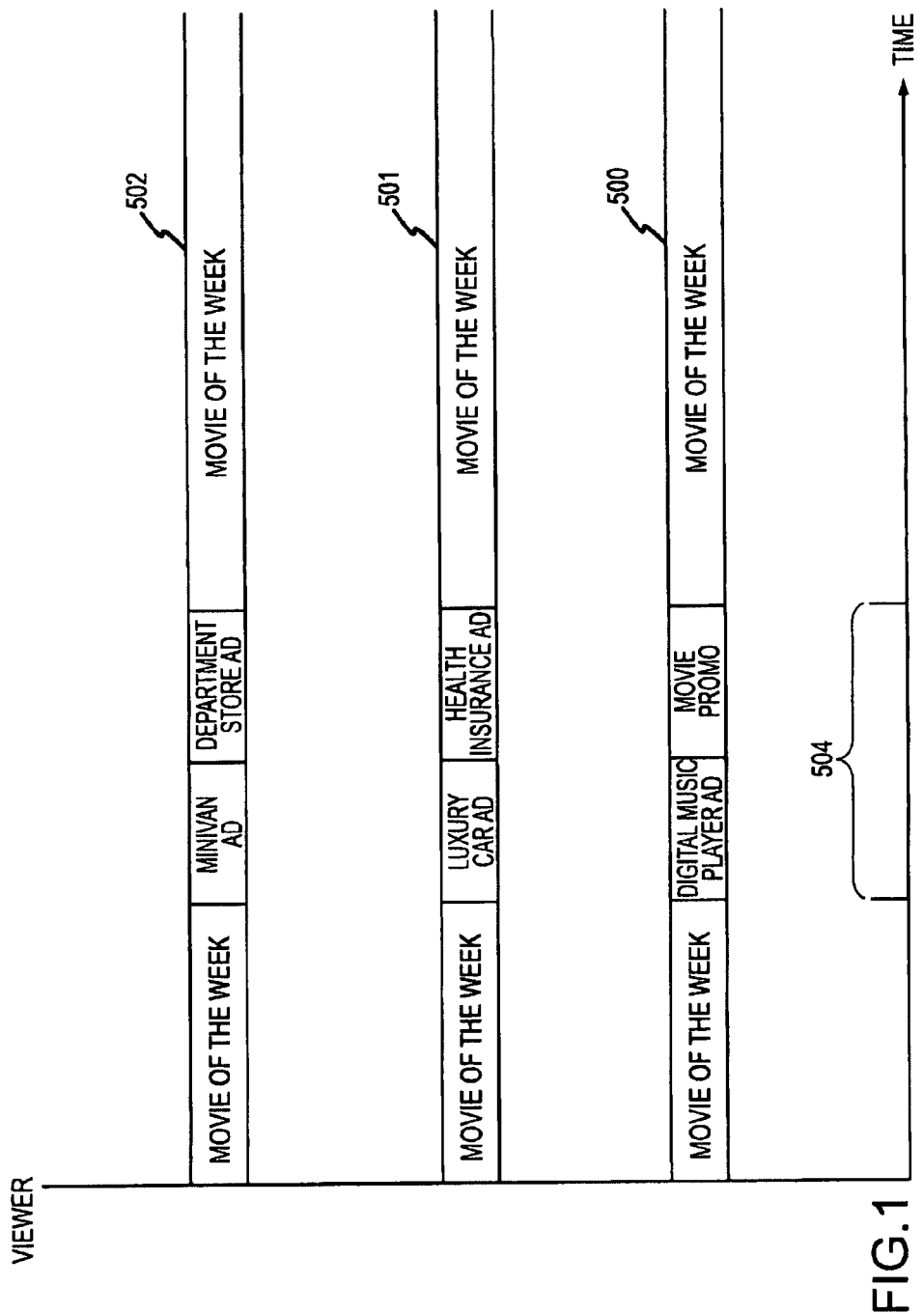
FIG. 1 illustrates delivery of assets to different users watching the same programming channel.

The present invention relates to various structure and functionality for delivery of targeted assets, classification of network users, matching of asset targeting parameters to audience classification parameters and network monitoring for use in a communications network. The invention has particular application with respect to networks where content is broadcast to network users. In this regard, content may be broadcast in a variety of networks including, for example, cable and satellite television networks, satellite radio networks, IP networks used for multicasting content and networks used for podcasts or telephony broadcasts/multicasts. Content may also be broadcast over the airwaves though, as will be understood from the description below, certain aspects of the invention make use of bi-directional communication channels which are not readily available, for example, in connection with conventional airwave based televisions or radios (i.e., such communication would involve supplemental communication systems). In various contexts, the content may be consumed in real time or stored for subsequent consumption. Thus, while specific examples are provided below in the context of a cable television network for purposes of illustration, it will be appreciated that the invention is not limited to such contexts but, rather, has application to a variety of networks and transmission modes.

The targeted assets may include any type of asset that is desired to be targeted to network users. It is noted that such targeted assets are sometimes referred to as "addressable" assets (though, as will be understood from the description below, targeting can be accomplished without addressing in a point-to-point sense). For example, these targeted assets may include advertisements, internal marketing (e.g., information about network promotions, scheduling or upcoming events), public service announcements, weather or emergency information, or programming. The targeted assets may be independent or included in a content stream with other assets such as untargeted network programming. In the latter case, the targeted assets may be interspersed with untargeted programming (e.g., provided during programming breaks) or may otherwise be combined with the programming as by being superimposed on a screen portion in the case of video programming. In the description below, specific examples are provided in the context of targeted assets provided during breaks in television programming. While this is an important commercial implementation of the invention, it will be appreciated that the invention has broader application. Thus, distinctions below between "programming" and "assets" such as advertising should not be understood as limiting the types of content that may be targeted or the contexts in which such content may be provided.

As noted above, the present invention relates to identifying members of an audience, determining classification information for those users, determining which user or users may be watching at a time of interest, and matching assets to the identified audience. The matching related functionality is useful in a variety of contexts in a targeted asset delivery system. Accordingly, an overview of the targeted asset delivery system is first provided below. Thereafter, the matching related functionality and associated structure is described in detail.

I. An Exemplary Targeted Asset Delivery System

A. The Targeted Asset Delivery Environment

Although the matching-related subject matter of the present invention can be used in a variety of targeted asset delivery systems, a particularly advantageous targeted asset delivery system is described below. The inventive system, in the embodiments described below, allows for delivery of targeted assets such as advertising so as to address certain shortcomings or inefficiencies of conventional broadcast networks. Generally, such targeting entails delivering assets to desired groups of individuals or individuals having desired characteristics. These characteristics or audience classification parameters may be defined based on personal information, demographic information, psychographic information, geographic information, or any other information that may be relevant to an asset provider in identifying a target audience. Preferably, such targeting is program independent in recognition that programming is a highly imperfect mechanism for targeting of assets. For example, even if user analysis indicates that a particular program has an audience comprised sixty percent of women, and women comprise the target audience for a particular asset, airing on that program will result in a forty percent mismatch. That is, forty percent of the users potentially reached may not be of interest to the asset provider and pricing may be based only on sixty percent of the total audience. Moreover, ideally, targeted asset delivery would allow for targeting with a range of granularities including very fine granularities. For example, it may be desired to target a group, such as based on a geographical grouping, a household characterization or even an individual user characterization. The present invention accommodates program independent targeting, targeting with a high degree of granularity and targeting based on a variety of different audience classifications.

Figure 2:
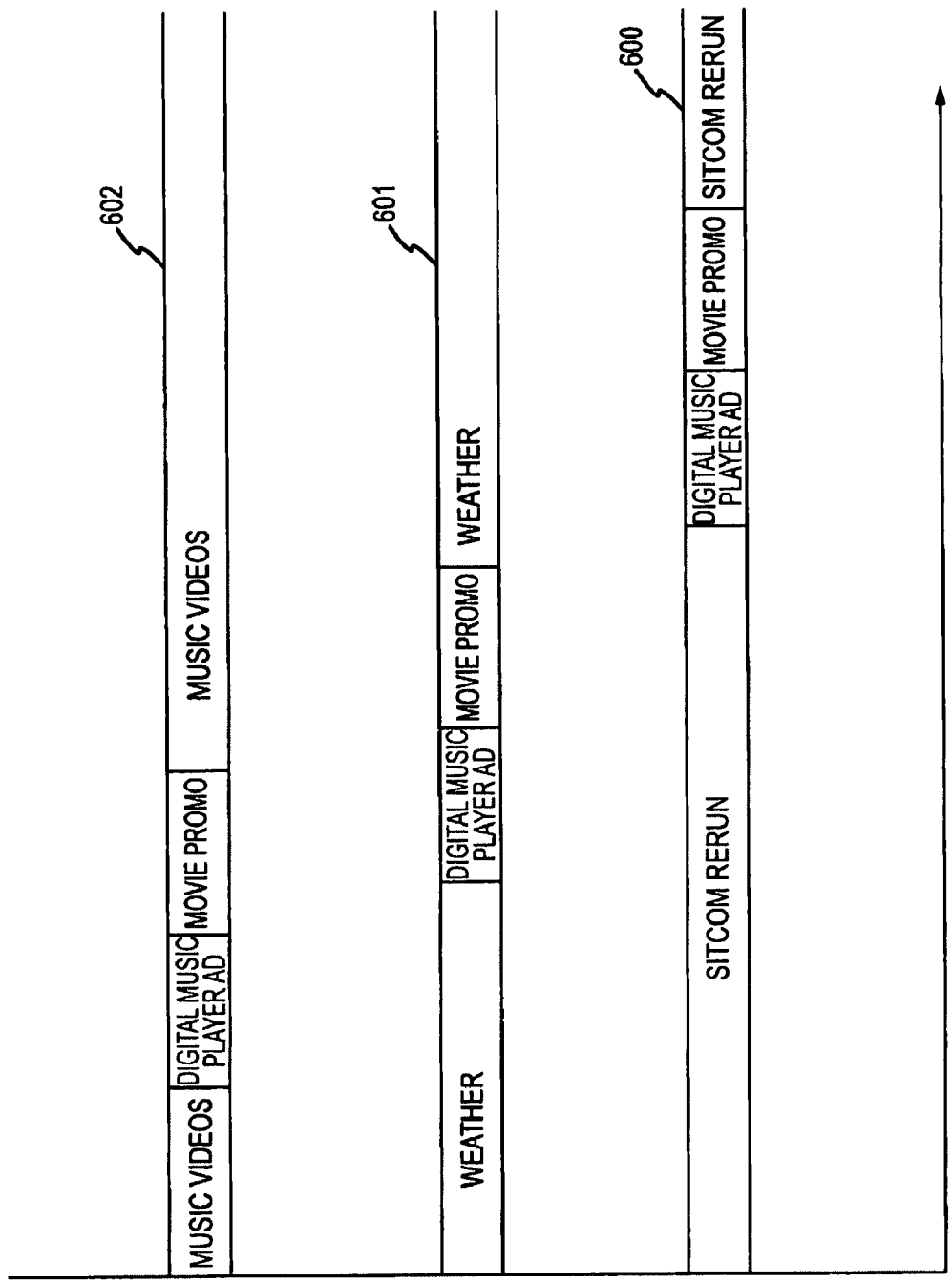
FIG. 2 illustrates audience aggregation across multiple programming networks.

FIGS. 1 and 2 illustrate two different contexts of targeted asset delivery supported in accordance with the present invention. Specifically, FIG. 1 illustrates the delivery of different assets, in this case ads, to different users watching the same programming channel, which may be referred to as spot optimization. As shown, three different users 500-502 are depicted as watching the same programming, in this case, denoted "Movie of the Week." At a given break 504 the users 500-502 each receive a different asset package. Specifically, user 500 receives a digital music player ad and a movie promo, user 501 receives a luxury car ad and a health insurance ad, and user 502 receives a minivan ad and a department store ad. Alternately, a single asset provider (e.g., a motor vehicle company) may purchase a spot and then provide different asset options for the spot (e.g., sports car, minivans, pickup trucks, etc.). Similarly, separate advertisers may collectively purchase a spot and then provide ads for their respective products (e.g., where the target audiences of the advertisers are complementary). It will be appreciated that these different asset packages may be targeted to different audience demographics. In this manner, assets are better tailored to particular viewers of a given program who may fall into different demographic groups. Thus, spot optimization refers to the delivery of different assets (by one or multiple asset providers) in a given spot.

Figure 3:
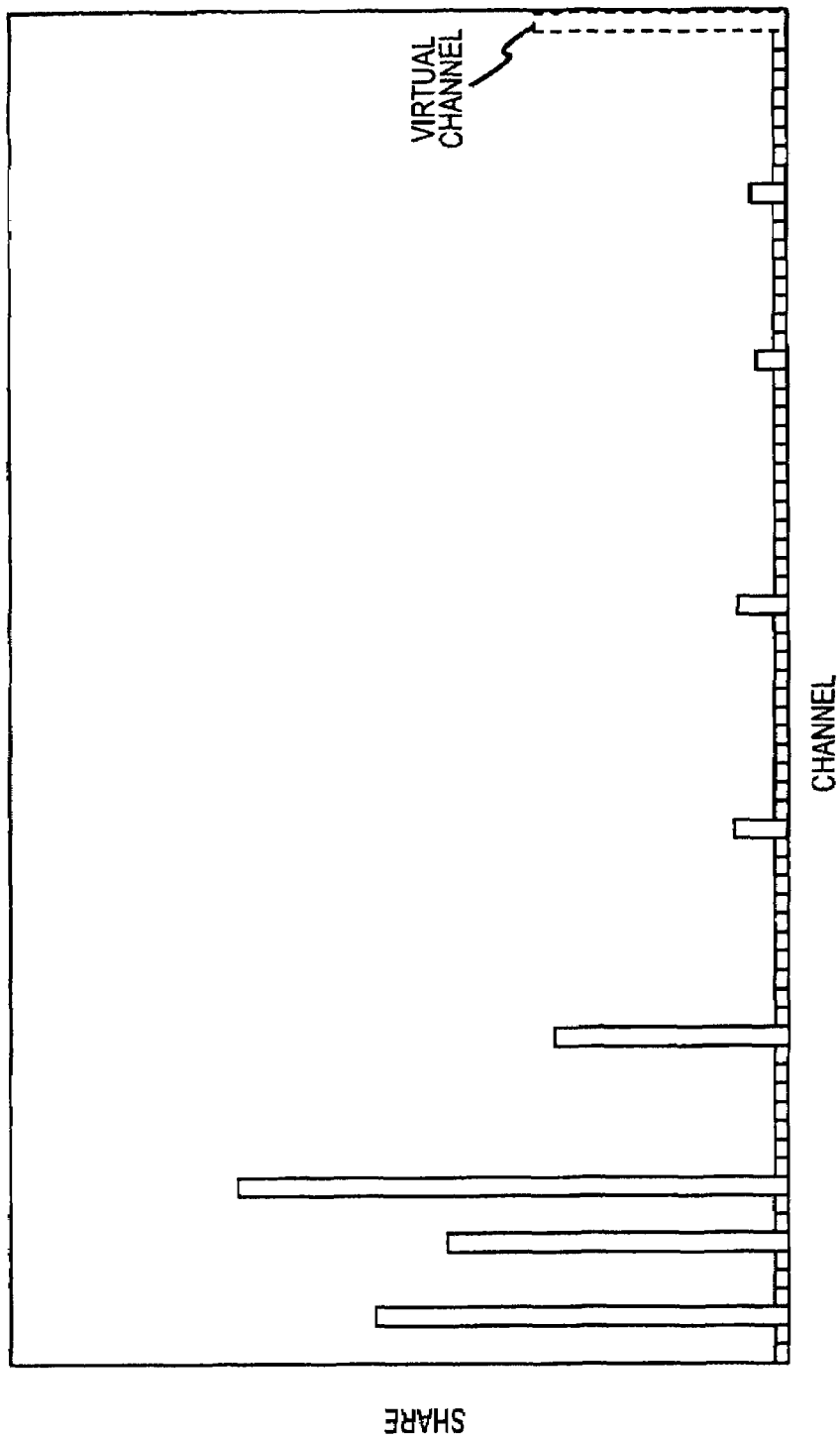
FIG. 3 illustrates a virtual channel in the context of audience aggregation.

FIG. 2 illustrates a different context of the present invention, which may be termed audience aggregation. In this case, three different users 600-602 viewing different programs associated with different channels may receive the same asset or asset package. In this case, each of the users 600-602 receives a package including a digital music player ad and a movie promo in connection with breaks associated with their respective channels. Though the users 600-602 are shown as receiving the same asset package for purposes of illustration, it is likely that different users will receive different combinations of assets due to differences in classification parameters. In this manner, users over multiple channels (some or all users of each channel) can be aggregated (relative to a given asset and time window) to define a virtual channel having significant user numbers matching a targeted audience classification. Among other things, such audience aggregation allows for the possibility of aggregating users over a number of low share channels to define a significant asset delivery opportunity, perhaps on the order of that associated with one of the high share networks. This can be accomplished, in accordance with the present invention, using equipment already at a user's premises (i.e., an existing CPE). Such a virtual channel is graphically illustrated in FIG. 3, though this illustration is not based on actual numbers. Thus, audience aggregation refers to the delivery of the same asset in different spots to define an aggregated audience. These different spots may occur within a time window corresponding to overlapping (conflicting) programs on different channels. In this manner, it is likely that these spots, even if at different times within the window, will not be received by the same users.

Figure 4:
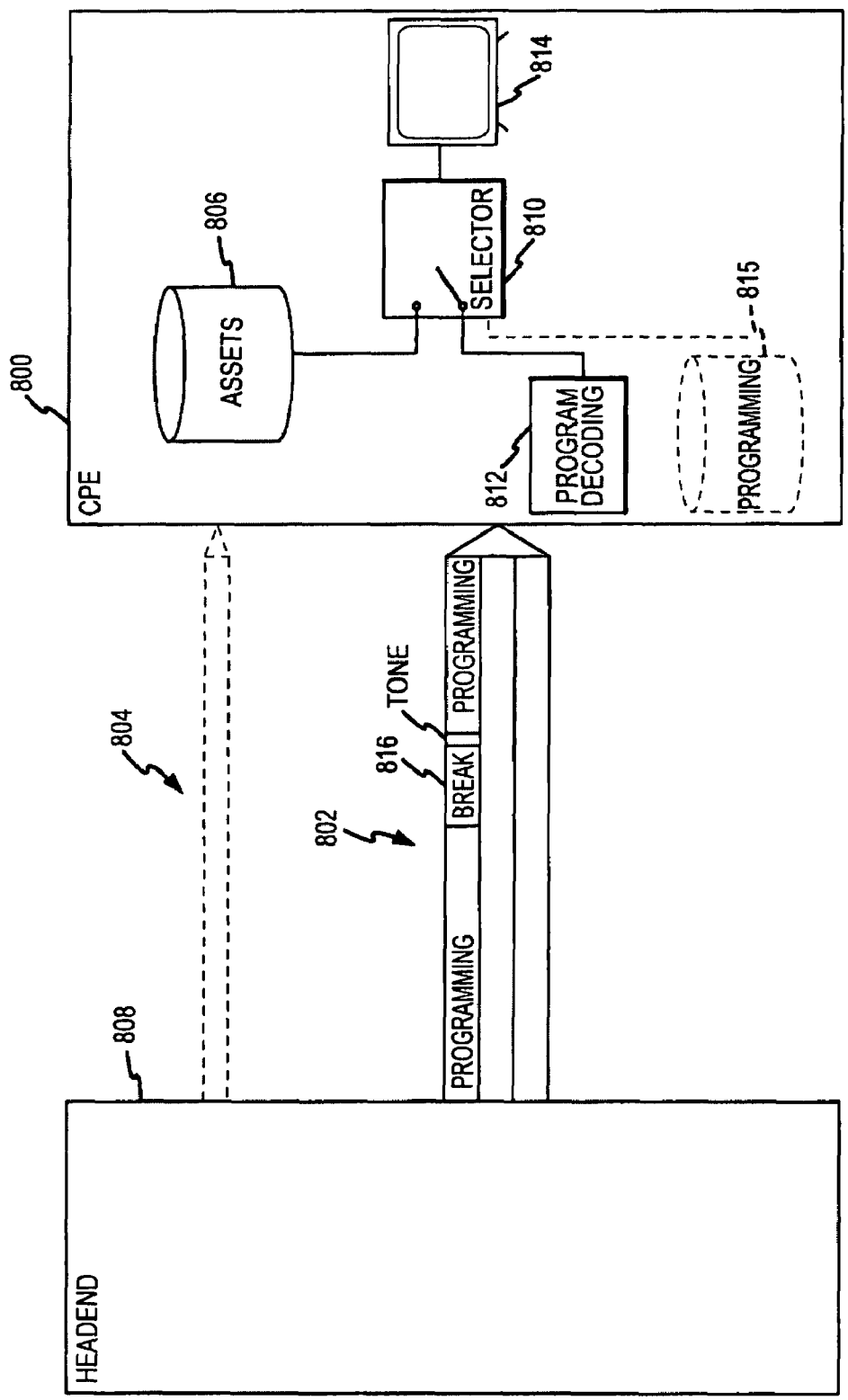
FIG. 4 illustrates targeted asset insertion being implemented at Customer Premises Equipment (CPEs).

Such targeting including both spot optimization and audience aggregation can be implemented using a variety of architectures in accordance with the present invention. Thus, for example, as illustrated in FIG. 4, targeted asset insertion can be implemented at the CPEs. This may involve a forward-and-store functionality. As illustrated in FIG. 4, the CPE 800 receives a programming stream 802 and an asset delivery stream 804 from the headend 808. These streams 802 and 804 may be provided via a common signal link such as a coaxial cable or via separate communications links. For example, the asset delivery stream 804 may be transmitted to the CPE 800 via a designated segment, e.g., a dedicated frequency range, of the available bandwidth or via a programming channel that is opportunistically available for asset delivery, e.g., when it is otherwise off air. The asset delivery stream 804 may be provided on a continuous or intermittent basis and may be provided concurrently with the programming stream 802. In the illustrated example, the programming stream 802 is processed by a program-decoding unit, such as DSTB, and programming is displayed on television set 814. Alternatively, the programming stream 802 may be stored in programming storage 815 for CPE insertion.

In the illustrated implementation, the asset, together with metadata identifying, for example, any audience classification parameters of the targeted audience, is stored in a designated storage space 806 of the CPE 800. It will be appreciated that substantial storage at the CPE 800 may be required in this regard. For example, such storage may be available in connection with certain digital video recorder (DVR) units. A selector 810 is implemented as a processor running logic on the CPE 800. The selector 810 functions analogously to the headend selector described above to identify breaks 816 and insert appropriate assets. In this case, the assets may be selected based on classification parameters of the household or, more preferably, a user within the household. Such information may be stored at the CPE 800 or may be determined based on an analysis of viewing habits such as a click stream from a remote control as will be described in more detail below. Certain aspects of the present invention can be implemented in such a CPE insertion environment.

Figure 5:
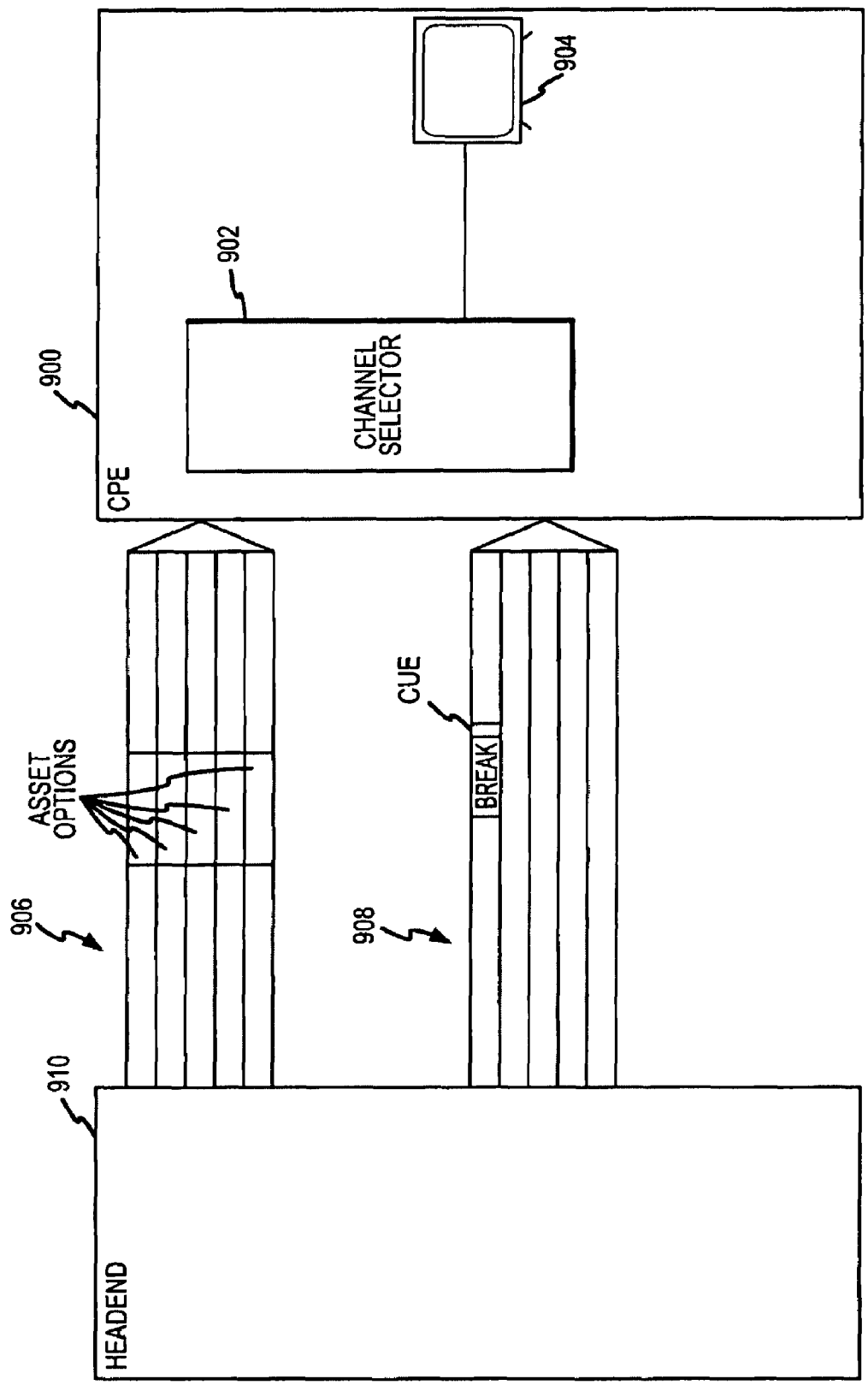
FIG. 5 illustrates asset options being transmitted from a headend on separate asset channels.

In FIG. 5, a different architecture is employed. Specifically, in FIG. 5, asset options transmitted from headend 910 synchronously with a given break on a given channel for which targeted asset options are supported. The CPE 900 includes a channel selector 902, which is operative to switch to an asset channel associated with a desired asset at the beginning of a break and to return to the programming channel at the end of the break. The channel selector 902 may hop between channels (between asset channels or between an asset channel and the programming channel) during a break to select the most appropriate assets. In this regard, logic resident on the CPE 900 controls such hopping to avoid switching to a channel where an asset is already in progress. As described below, this logic can be readily implemented, as the schedule of assets on each asset channel is known. Preferably, all of this is implemented invisibly from the perspective of the user of set 904. The different options may be provided, at least in part, in connection with asset channels 906 or other bandwidth segments (separate from programming channels 908) dedicated for use in providing such options. In addition, certain asset options may be inserted into the current programming channel 908. Associated functionality is described in detail below. The architecture of FIG. 5 has the advantage of not requiring substantial storage resources at the CPE 900 such that it can be immediately implemented on a wide scale basis using equipment that is already in the field.

As a further alternative, the determination of which asset to show may be made at the headend. For example, an asset may be selected based on voting as described below, and inserted at the headend into the programming channel without options on other asset channels. This would achieve a degree of targeting but without spot optimization opportunities as described above. Still further, options may be provided on other asset channels, but the selection as between those channels may be determined by the headend. For example, information about a household or user (e.g., brand of car owned, magazines subscribed to, etc.) stored on the headend may be used to match an asset to a household or user. That information, which may be termed "marketing labels," may be used by the headend to control which asset is selected by the CPE. For example, the CPE may be instructed that it is associated with an "ACME preferred" customer. When an asset is disseminated with ACME preferred metadata, the CPE may be caused to select that asset, thereby overriding (or significantly factoring with) any other audience classification considerations. However, it will be appreciated that such operation may entail certain concerns relating to sensitive information or may compromise audience classification based targeting in other respects.

A significant opportunity thus exists to better target users whom asset providers may be willing to pay to reach and to better reach hard-to-reach users. However, a number of challenges remain with respect to achieving these objectives including: how to provide asset options within network bandwidth limitations and without requiring substantial storage requirements and new equipment at the user's premises; how to obtain sufficient information for effective targeting while addressing privacy concerns; how to address a variety of business related issues, such as pricing of asset delivery, resulting from availability of asset options and attendant contingent delivery; and how to operate effectively within the context of existing network structure and systems (e.g., across node filters, using existing traffic and billing systems, etc.).

From the foregoing it will be appreciated that various aspects of the invention are applicable in the context of a variety of networks, including broadcast networks. In the following discussion, specific implementations of a targeted asset system are discussed in the context of a cable television network. Though the system enhances viewing for both analog and digital users, certain functionality is conveniently implemented using existing DSTBs. It will be appreciated that, while these represent particularly advantageous and commercially valuable implementations, the invention is not limited to these specific implementations or network contexts.

B. System Architecture

In one implementation, the system of the present invention involves the transmission of asset options in time alignment or synchronization with other assets on a programming channel, where the asset options are at least partially provided via separate bandwidth segments, e.g. channels at least temporarily dedicated to targeted asset delivery. Although such options may typically be transmitted in alignment with a break in programming, it may be desired to provide options opposite continuing programming (e.g., so that only subscribers in a specified geographic area get a weather announcement, an emergency announcement, election results or other local information while others get uninterrupted programming). Selection as between the available options is implemented at the user's premises, as by a DSTB in this implementation. In this manner, asset options are made available for better targeting, without the requirement for substantial storage resources or equipment upgrades at the user's premises (e.g., as might be required for a forward-and-store architecture). Indeed, existing DSTBs can be configured to execute logic for implementing the system described below by downloading and/or preloading appropriate logic.

Because asset options are synchronously transmitted in this implementation, it is desirable to be efficient in identifying available bandwidth and in using that bandwidth. Various functionality for improved bandwidth identification, e.g., identifying bandwidth that is opportunistically available in relation to a node filter, is described later in this discussion. Efficient use of available bandwidth involves both optimizing the duty cycle or asset density of an available bandwidth segment (i.e., how much time, of the time a bandwidth segment is available for use in transmitting asset options, is the segment actually used for transmitting options) and the value of the options transmitted. The former factor is addressed, among other things, by improved scheduling of targeted asset delivery on the asset channels in relation to scheduled breaks of the programming channels.

Figure 6:
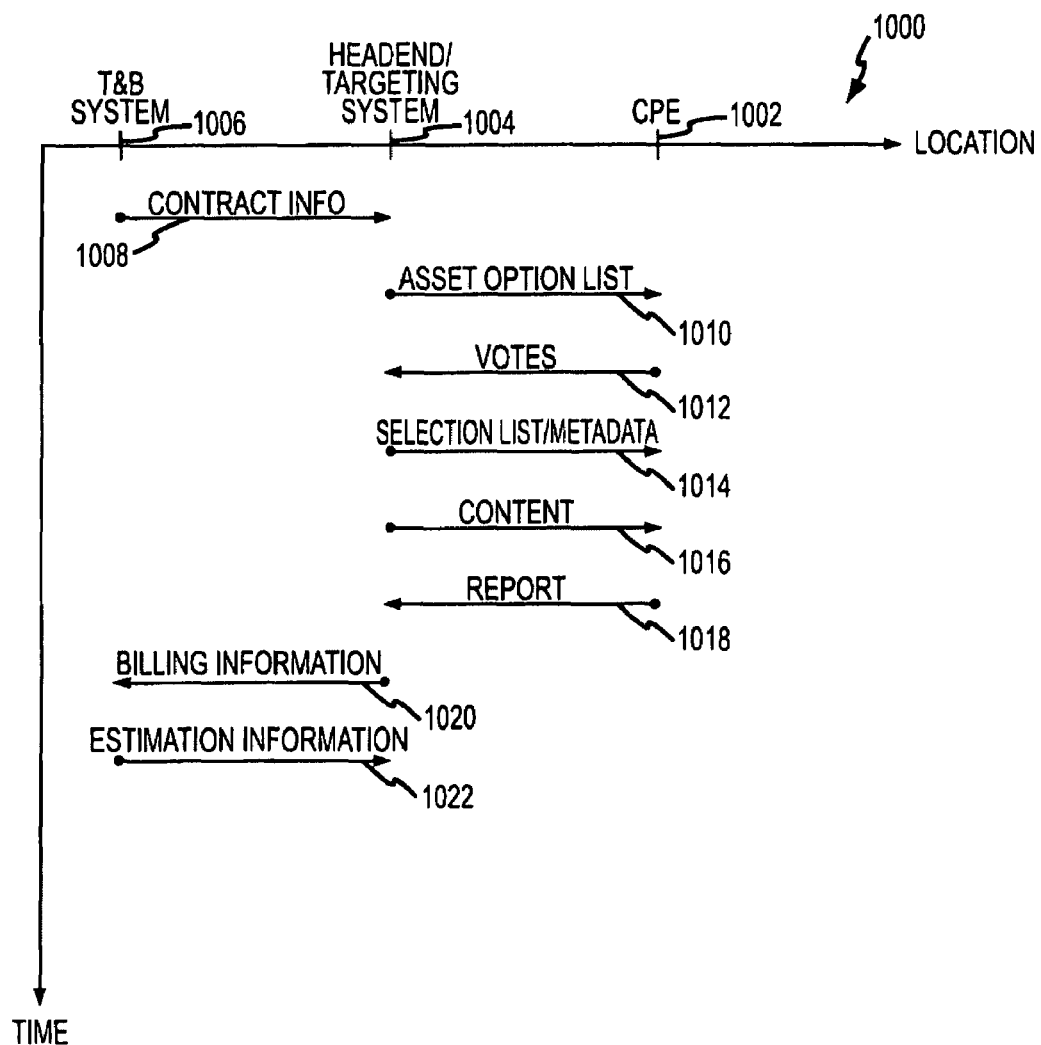
FIG. 6 illustrates a messaging sequence between a CPE, a network platform, and a traffic and billing (T&B) system.

The latter factor is addressed in part by populating the available bandwidth spots with assets that are most desired based on current network conditions. These most desired assets can be determined in a variety of ways including based on conventional ratings. In the specific implementation described below, the most desired assets are determined via a process herein termed voting. FIG. 6 illustrates an associated messaging sequence 1000 in this regard as between a CPE 1002 such as a DSTB, a network platform for asset insertion such as a headend 1004 and a traffic and billing (T&B) system 1006 used in the illustrated example for obtaining asset delivery orders or contracts and billing for asset delivery. It will be appreciated that the functionality of the T&B system 1006 may be split between multiple systems running on multiple platforms and the T&B system 1006 may be operated by the network operator or may be separately operated.

The illustrated sequence begins by loading contract information 1008 from the T&B system 1006 onto the headend 1004. An interface associated with system 1006 allows asset providers to execute contracts for dissemination of assets based on traditional time-slot buys (for a given program or given time on a given network) or based on a certain audience classification information (e.g., desired demographics, psychographics, geography, and/or audience size). In the latter case, the asset provider or network may identify audience classification information associated with a target audience. The system 1006 uses this information to compile the contract information 1008, which identifies the asset that is to be delivered together with delivery parameters regarding when and to whom the asset is to be delivered.

The illustrated headend 1004 uses the contract information together with a schedule of breaks for individual networks to compile an asset option list 1010 on a channel-by-channel and break-by-break basis. That is, the list 1010 lists the universe of asset options that are available for voting purposes for a given break on a given programming channel together with associated metadata identifying the target audience for the asset, e.g., based on audience classification information. The transmitted list 1010 may encompass all supported programming channels and may be transmitted to all participating users, or the list may be limited to one or a subset of the supported channels e.g., based on an input indicating the current channel or the most likely or frequent channels used by a particular user or group of users. The list 1010 is transmitted from the headend 1004 to the CPE 1002 in advance of a break for which options are listed.

Based on the list 1010, the CPE 1002 submits a vote 1012 back to the headend 1004. More specifically, the CPE 1002 first identifies the classification parameters for the current user(s) and perhaps the current channel being watched, identifies the assets that are available for an upcoming break (for the current channel or multiple channels) as well as the target audience for those assets and determines a "fit" of one or more of those asset options to the current classification. In one implementation, each of the assets is attributed a fit score for the user(s), e.g., based on a comparison of the audience classification parameters of the asset to the putative audience classification parameters of the current user(s). This may involve how well an individual user classification parameter matches a corresponding target audience parameter and/or how many of the target audience parameters are matched by the user's classification parameters. Based on these fit scores, the CPE 1002 issues the vote 1012 indicating the most appropriate asset(s). Any suitable information can be used to provide this indication. For example, all scores for all available asset options (for the current channel or multiple channels) may be included in the vote 1012. Alternatively, the vote 1012 may identify a subset of one or more options selected or deselected by the CPE 1002, with or without scoring information indicating a degree of the match and may further include channel information. In one implementation, the headend 1004 instructs CPEs (1002) to return fit scores for the top N asset options for a given spot, where N is dynamically configurable based on any relevant factor such as network traffic levels and size of the audience. Preferably, this voting occurs shortly before the break at issue such that the voting more accurately reflects the current status of network users. In one implementation, votes are only submitted for the programming channel to which the CPE is set, and votes are submitted periodically, e.g., every fifteen minutes.

The headend 1004 compiles votes 1012 from CPEs 1002 to determine a set of selected asset options 1014 for a given break on a supported programming channel. As will be understood from the description below, such votes 1012 may be obtained from all relevant and participating CPEs 1002 (who may be representative of a larger audience including analog or otherwise non-participating users) or a statistical sampling thereof. In addition, the headend 1004 determines the amount of bandwidth, e.g., the number of dedicated asset option channels, that is available for transmission of options in support of a given break for a given programming channel.

Based on all of this information, the headend 1004 assembles a flotilla of assets, e.g., the asset options having the highest vote values or the highest weighted vote values where such weighting takes into account value per user or other information beyond classification fit. Such a flotilla may include asset options inserted on the current programming channel as well as on asset channels, though different insertion processes and components may be involved for programming channel and asset channel insertion. It will be appreciated that some assets may be assembled independently or largely independently of voting, for example, certain public service spots or where a certain provider has paid a premium for guaranteed delivery. Also, in spot optimization contexts where a single asset provider buys a spot and then provides multiple asset options for that spot, voting may be unnecessary (though voting may still be used to select the options).

In one implementation, the flotilla is assembled into sets of asset options for each dedicated asset channel, where the time length of each set matches the length of the break, such that channel hopping within a break is unnecessary. Alternatively, the CPE 1002 may navigate between the asset channels to access desired assets within a break (provided that asset starts on the relevant asset channels are synchronized). However, it will be appreciated that the flotilla matrix (where columns include options for a given spot and rows correspond to channels) need not be rectangular. Stated differently, some channels may be used to provide asset options for only a portion of the break, i.e., may be used at the start of the break for one or more spots but are not available for the entire break, or may only be used after one or more spots of a break have aired. A list of the selected assets 1014 and the associated asset channels is then transmitted together with metadata identifying the target audience in the illustrated implementation. It will be appreciated that it may be unnecessary to include the metadata at this step if the CPE 1002 has retained the asset option list 1010. This list 1014 is preferably transmitted shortly in advance of transmission of the asset 1016 (which includes sets of asset options for each dedicated contact options channel used to support, at least in part, the break at issue).

The CPE 1002 receives the list of selected asset options 1014 and associated metadata and selects which of the available options to deliver to the user(s). For example, this may involve a comparison of the current audience classification parameter values (which may or may not be the same as those used for purposes of voting) to the metadata associated with each of the asset options. The selected asset option is used to selectively switch the CPE 1002 to the corresponding dedicated asset options channel to display the selected asset 1016 at the beginning of the break at issue. One of the asset option sets, for example, the one comprised of the asset receiving the highest vote values, may be inserted into the programming channel so that switching is not required for many users. Assuming that the voting CPEs are at least somewhat representative of the universe of all users, a significant degree of targeting is thereby achieved even for analog or otherwise non-participating users. In this regard, the voters serve as proxies for non-voting users. The CPE 1002 returns to the programming channel at the conclusion of the break. Preferably, all of this is transparent from the perspective of the user(s), i.e., preferably no user input is required. The system may be designed so that any user input overrides the targeting system. For example, if the user changes channels during a break, the change will be implemented as if the targeting system was not in effect (e.g., a command to advance to the next channel will set the CPE to the channel immediately above the current programming channel, without regard to any options currently available for that channel, regardless of the dedicated asset channel that is currently sourcing the television output).

In this system architecture, as in forward-and-store architectures or any other option where selections between asset options are implemented at the CPE, there will be some uncertainty as to how many users or households received any particular asset option in the absence of reporting. This may be tolerable from a business perspective. In the absence of reporting, the audience size may be estimated based on voting data, conventional ratings analysis and other tools. Indeed, in the conventional asset delivery paradigm, asset providers accept Nielsen rating estimates and demographic information together with market analysis to gauge return on investment. However, this uncertainty is less than optimal in any asset delivery environment and may be particularly problematic in the context of audience aggregation across multiple programming networks, potentially including programming networks that are difficult to measure by conventional means.

The system of the present invention preferably implements a reporting system by which individual CPEs 1002 report back to the headend 1004 what asset or assets were delivered at the CPE 1002 and, optionally, to whom (in terms of audience classification). Additionally, the reports may indicate where (on what programming channel) the asset was delivered and how much (if any) of the asset was consumed. Such reports 1018 may be provided by all participating CPEs 1002 or by a statistical sampling thereof. These reports 1018 may be generated on a break-by-break basis, periodically (e.g., every 15 minutes) or may be aggregated prior to transmission to the headend 1004. Reports may be transmitted soon after delivery of the assets at issue or may be accumulated, e.g., for transmission at a time of day where messaging bandwidth is more available. Moreover, such reporting may be coordinated as between the CPEs 1002 so as to spread the messaging load due to reporting.

In any case, the reports 1018 can be used to provide billing information 1020 to the T&B system 1006 for valuing the delivery of the various asset options. For example, the billing information 1020 can be used by the T&B system 1006 to determine how large an audience received each option and how well that audience matched the target audience. For example, as noted above, a fit score may be generated for particular asset options based on a comparison of the audience classification to the target audience. This score may be on any scale, e.g., 1-100. Goodness of fit may be determined based on this raw score or based on characterization of this score such as "excellent," "good," etc. Again, this may depend on how well an individual audience classification parameter of a user matches a corresponding target audience parameter and/or how many of the target audience parameters are matched by the user's audience classification parameters. This information may in turn be provided to the asset provider, at least in an aggregated form. In this manner, the network operator can bill based on guaranteed delivery of targeted messages or scale the billing rate (or increase delivery) based on goodness of fit as well as audience size. The reports (and/or votes) 1018 can also provide a quick and detailed measurement of user distribution over the network that can be used to accurately gauge ratings, share, demographics of audiences and the like. Moreover, this information can be used to provide future audience estimation information 1022, for example, to estimate the total target universe based on audience classification parameters.

It will thus be appreciated that the present invention allows a network operator such as an MSO to sell asset delivery under the conventional asset delivery (time-slot) buy paradigm or under the new commercial impression paradigm or both. For example, a particular MSO may choose to sell asset delivery space for the major networks (or for these networks during prime time) under the old time-slot buy paradigm while using the commercial impression paradigm to aggregate users over multiple low market share networks. Another MSO may choose to retain the basic time-slot buy paradigm while accommodating asset providers who may wish to fill a given slot with multiple options targeted to different demographics. Another MSO may choose to retain the basic time-slot buy paradigm during prime time across all networks while using the targeted impression paradigm to aggregate users at other times of the day. The targeted impression paradigm may be used by such MSOs only for this limited purpose.

Figure 8:
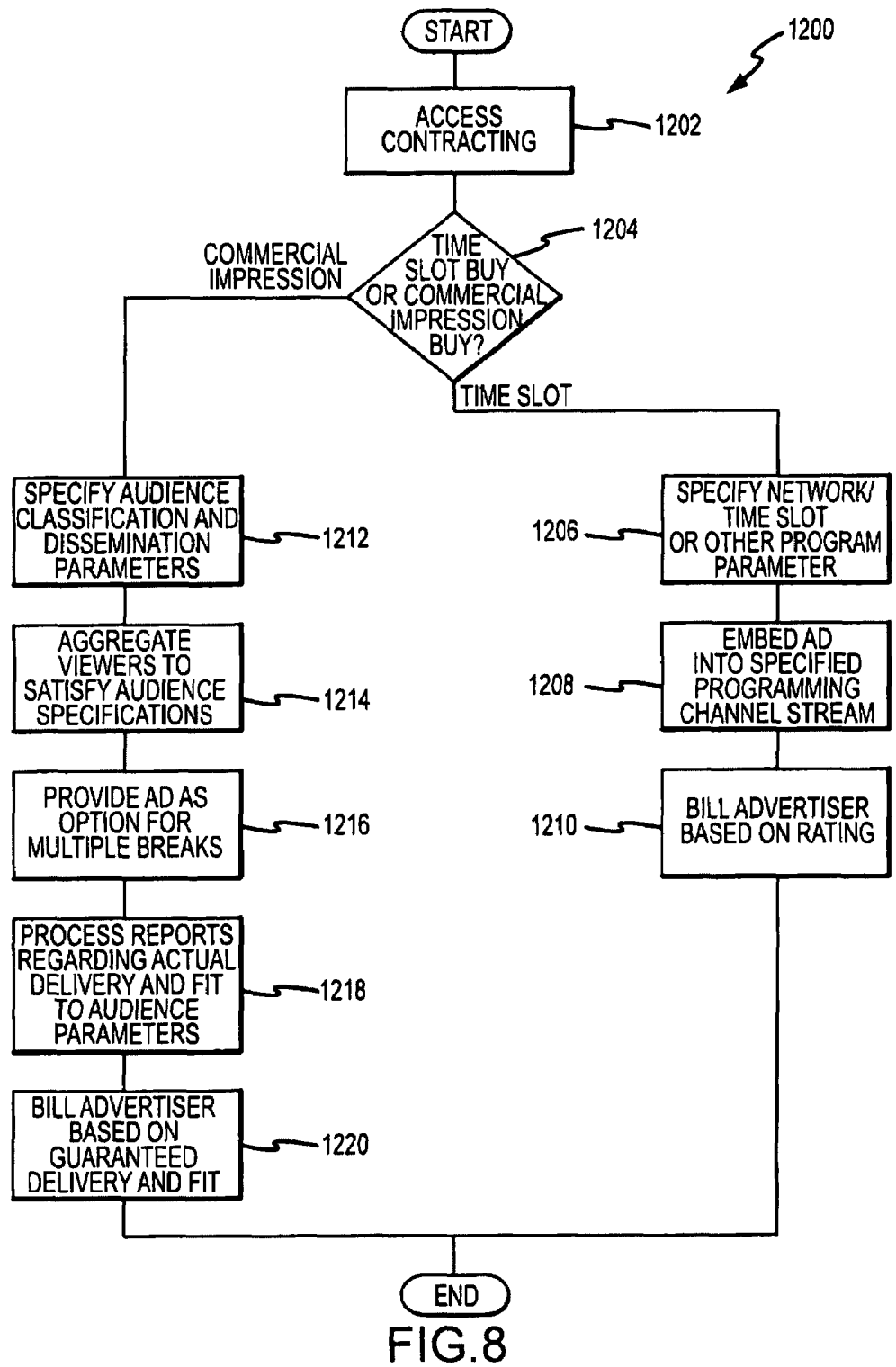
FIG. 8 is a flow chart illustrating a process for implementing time-slot and targeted impression buys.

FIG. 8 is a flow chart illustrating an associated process 1200. An asset provider (or agent thereof) can initiate the illustrated process 1200 by accessing (1202) a contracting platform as will be described below. Alternatively, an asset provider can work with the sales department or other personnel of a system operator or other party who accesses such a platform. As a still further alternative, an automated buying system may be employed to interface with such a platform via a system-to-system interface. This platform may provide a graphical user interface by which an asset provider can design a dissemination strategy and enter into a corresponding contract for dissemination of an asset. The asset provider can then use the interface to select (1204) to execute either a time-slot buy strategy or a targeted impression buy strategy. In the case of a time-slot buy strategy, the asset provider can then use the user interface to specify (1206) a network and time-slot or other program parameter identifying the desired air times and frequency for delivery of the asset. Thus, for example, an asset provider may elect to air the asset in connection with specifically identified programs believed to have an appropriate audience. In addition, the asset provider may specify that the asset is to appear during the first break or during multiple breaks during the program. The asset provider may further specify that the asset is to be, for example, aired during the first spot within the break, the last spot within the break or otherwise designate the specific asset delivery slot.

Once the time-slots for the asset have thus been specified, the MSO causes the asset to be embedded (1208) into the specified programming channel asset stream. The asset is then available to be consumed by all users of the programming channel. The MSO then bills (1210) the asset provider, typically based on associated ratings information. For example, the billing rate may be established in advance based on previous rating information for the program in question, or the best available ratings information for the particular airing of the program may be used to bill the asset provider. It will thus be appreciated that the conventional time-slot buy paradigm is limited to delivery to all users for a particular time-slot on a particular network and does not allow for targeting of particular users of a given network or targeting users distributed over multiple networks in a single buy.

In the case of targeted impression buys, the asset provider can use the user interface as described in more detail below to specify (1212) audience classification and other dissemination parameters. In the case of audience classification parameters, the asset provider may specify the gender, age range, income range, geographical location, lifestyle interest or other information of a targeted audience. The additional dissemination parameters may relate to delivery time, frequency, audience size, or any other information useful to define a target audience. Combinations of parameters may also be specified. For example, an asset provider may specify an audience size of 100,000 in a particular demographic group and further specify that the asset is not delivered to any user who has already received the asset a predetermined number of times.

Based on this information, the targeted asset system of the present invention is operative to target appropriate users. For example, this may involve targeting only selected users of a major network. Additionally or alternatively, this may involve aggregating (1214) users across multiple networks to satisfy the audience specifications. For example, selected users from multiple programming channels may receive the asset within a designated time period in order to provide an audience of the desired size, where the audience is composed of users matching the desired audience classification. The user interface preferably estimates the target universe based on the audience classification and dissemination parameters such that the asset provider receives an indication of the likely audience size.

The aggregation system may also be used to do time of day buys. For example, an asset provider could specify audience classification parameters for a target audience and further specify a time and channel for airing of the asset. CPEs tuned to that channel can then select the asset based on the voting process as described herein. Also, asset providers may designate audience classification parameters and a run time or time range, but not the programming channel. In this manner, significant flexibility is enabled for designing a dissemination strategy. It is also possible for a network operator to disable some of these strategy options, e.g., for business reasons.

Based on this input information, the targeted asset system of the present invention is operative to provide the asset as an option during one or more time-slots of one or more breaks. In the case of spot optimization, multiple asset options may be disseminated together with information identifying the target audience so that the most appropriate asset can be delivered at individual CPEs. In the case of audience aggregation, the asset may be provided as an option in connection with multiple breaks on multiple programming channels. The system then receives and processes (1218) reports regarding actual delivery of the asset by CPEs and information indicating how well the actual audience fit the classification parameters of the target audience. The asset provider can then be billed (1220) based on guaranteed delivery and goodness of fit based on actual report information. It will thus be appreciated that a new asset delivery paradigm is defined by which assets are targeted to specific users rather than being associated with particular programs. This enables both better targeting of individual users for a given program and improved reach to target users on low-share networks.

From the foregoing, it will be appreciated that various steps in the messaging sequence are directed to matching assets to users based on classification parameters, allowing for goodness of fit determinations based on such matching or otherwise depending on communicating audience classification information across the network. It is preferable to implement such messaging in a manner that is respectful of user privacy concerns and relevant regulatory regimes.

In the illustrated system, this is addressed by implementing the system free from persistent storage of a user profile or other sensitive information including, for example, personally identifiable information (PII). Specifically, it may be desired to protect as sensitive information subject matter extending beyond the established definition of PII. As one example in this regard, it may be desired to protect MAC addresses even though such addresses are not presently considered to be included within the definition of PII in the United States. Generally, any information that may entail privacy concerns or identify network usage information may be considered sensitive information. More particularly, the system learns of current network conditions prior to transmission of asset options via votes that identify assets without any sensitive information. Reports may also be limited to identifying assets that have been delivered (which assets are associated with target audience parameters) or characterization of the fit of audience classification parameters of a user(s) to a target audience definition. Even if it is desired to associate reports with particular users, e.g., to account for ad skipping as discussed below, such association may be based on an identification code or address not including PII. In any event, identification codes or any other information deemed sensitive can be immediately stripped and discarded or hashed, and audience classification information can be used only in anonymous and aggregated form to address any privacy concerns. With regard to hashing, sensitive information such as a MAC or IP address (which may be included in a designated header field) can be run through a hash function and reattached to the header, for example, to enable anonymous identification of messages from the same origin as may be desired. Moreover, users can be notified of the targeted asset system and allowed to opt in or opt out such that participating users have positively assented to participate.

Much of the discussion above has referenced audience classification parameters as relating to individuals as opposed to households. FIG. 7A illustrates a theoretical example of a CPE including a television set 1100 and a DSTB 1102 that are associated with multiple users 1103-1106. Arrow 1107 represents a user input stream, such as a click stream from a remote control, over time. A first user 1105, in this case a child, uses the television 1100 during a first time period—for example, in the morning. Second and third users 1103 and 1104 (designated "father" and "mother") use the television during time periods 1109 and 1110, which may be, for example, in the afternoon or evening. A babysitter 1106 uses the television during a nighttime period in this example.

This illustrates a number of challenges related to targeted asset delivery. First, because there are multiple users 1103-1106, targeting based on household demographics would have limited effectiveness. For example, it may be assumed that the child 1105 and father 1103 in many cases would not be targeted by the same asset providers. Moreover, in some cases, multiple users may watch the same television at the same time as indicated by the overlap of time periods 1109-1110. In addition, in some cases such as illustrated by the babysitter 1106 an unexpected user (from the perspective of the targeted asset system) may use the television 1100.

These noted difficulties are associated with a number of objectives that are preferably addressed by the targeted asset system of the present invention. First, the system should preferably be operative to distinguish between multiple users of a single set and, in the context of the system described above, vote and report to the network accordingly. Second, the system should preferably react over time to changing conditions such as the transitions from use by father 1103 to use by both father and mother 1103 and 1104 to use by only mother 1104. The system should also preferably have some ability to characterize unexpected users such as the babysitter 1106. In that case, the system may have no other information to go on other than the click stream 1107. The system may also identify time periods where, apparently, no user is present, though the set 1100 may still be on. Preferably, the system also operates free from persistent storage of any user profile or sensitive information so that no third party has a meaningful opportunity to misappropriate such information or discover the private network usage patterns of any of the users 1103-1106 via the targeted asset system. Privacy concerns can alternatively be addressed by obtaining consent from users. In this matter, sensitive information including PII can be transmitted across the network and persistently stored for use in targeting. This may allow for compiling a detailed user profile, e.g., at the headend. Assets can then be selected based on the user profile and, in certain implementations, addressed to specific CPEs.

In certain implementations, the present invention monitors the click stream over a time window and applies a mathematical model to match a pattern defined by the click stream to predefined audience classification parameters that may relate to demographic or psychographic categories. It will be appreciated that the click stream will indicate programs selected by users, volume and other information that may have some correlation, at least in a statistical sense, to the classification parameters. In addition, factors such as the frequency of channel changes and the length of time that the user lingers on a particular asset may be relevant to determining a value of an audience classification parameter. The system can also identify instances where there is apparently no user present.

In a first implementation, as is described in detail below, logic associated with the CPE 1101 uses probabilistic modeling, fuzzy logic and/or machine learning to progressively estimate the audience classification parameter values of a current user or users based on the click stream 1107. This process may optionally be supplemental based on stored information (preferably free of sensitive information) concerning the household that may, for example, affect probabilities associated with particular inputs. In this manner, each user input event (which involves one or more items of change of status and/or duration information) can be used to update a current estimate of the audience classification parameters based on associated probability values. The fuzzy logic may involve fuzzy data sets and probabilistic algorithms that accommodate estimations based on inputs of varying and limited predictive value.

In a second implementation, the click stream is modeled as an incomplete or noisy signal that can be processed to obtain audience classification parameter information. More specifically, a series of clicks over time or associated information can be viewed as a time-based signal. This input signal is assumed to reflect a desired signature or pattern that can be correlated to audience classification parameters. However, the signal is assumed to be incomplete or noisy—a common problem in signal processing. Accordingly, filtering techniques are employed to estimate the "true" signal from the input stream and associated algorithms correlate that signal to the desired audience classification information. For example, a nonlinear adaptive filter may be used in this regard.

In either of these noted examples, certain preferred characteristics apply. First, the inputs into the system are primarily a click stream and stored aggregated or statistical data, substantially free of any sensitive information. This addresses privacy concerns as noted above but also provides substantial flexibility to assess new environments such as unexpected users. In addition, the system preferably has a forgetfulness such that recent inputs are more important than older inputs. Either of the noted examples accommodates this objective. It will be appreciated that such forgetfulness allows the system to adapt to change, e.g., from a first user to multiple users to a second user. In addition, such forgetfulness limits the amount of viewing information that is available in the system at any one time, thereby further addressing privacy concerns, and limits the time period during which such information could conceivably be discovered. For example, information may be deleted and settings may be reset to default values periodically, for example, when the DSTB is unplugged.

Figure 7B:
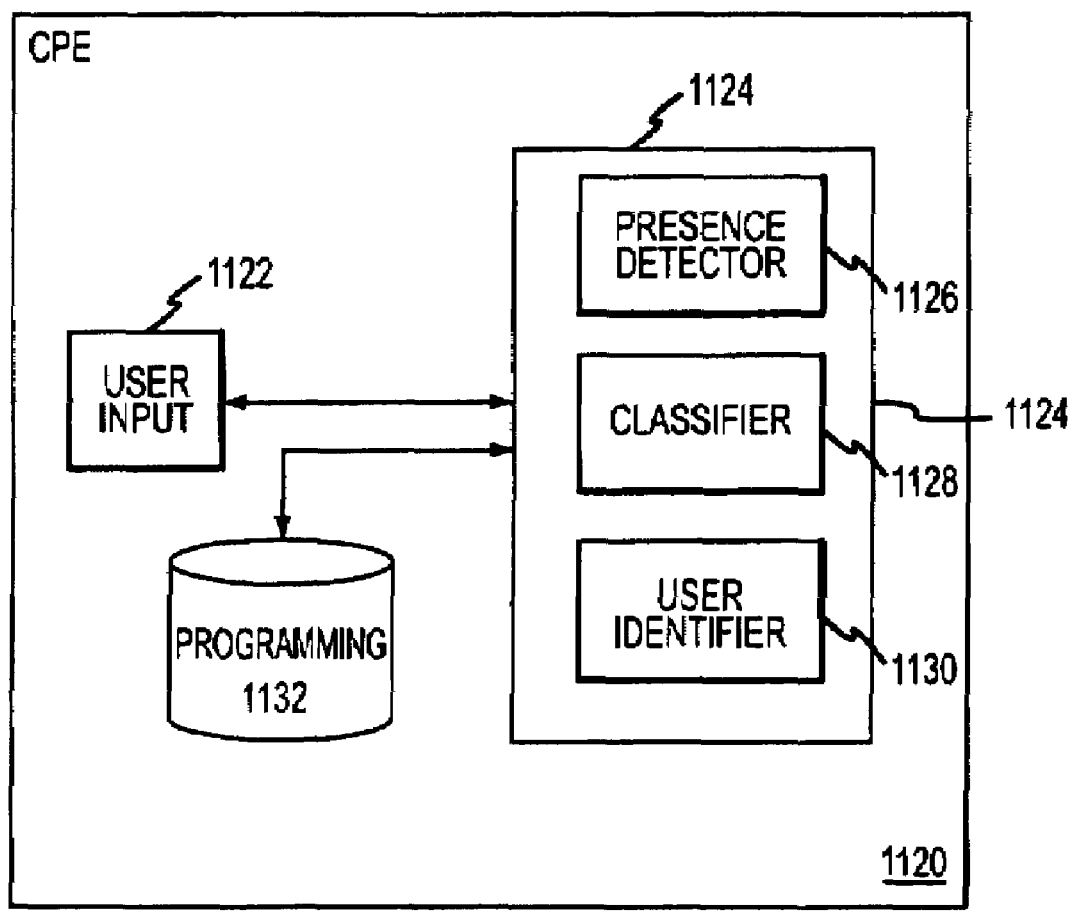
FIG. 7B illustrates a user classifier.

A block diagram of a system implementing such a user classification system is shown in FIG. 7B. The illustrated system is implemented in a CPE 1120 including a user input module 1122 and a classification module 1124. The user input module receives user inputs, e.g., from a remote control or television control buttons, that may indicate channel selections, volume settings and the like. These inputs are used together with programming information 1132 (which allows for correlation of channel selections to programming and/or associated audience profiles) for a number of functions. In this regard, the presence detector 1126 determines whether it is likely that a user is present for all or a portion of an asset that is delivered. For example, a long time period without any user inputs may indicate that no user is present and paying attention or a volume setting of zero may indicate that the asset was not effectively delivered. The classifier 1128 develops audience classification parameters for one or more users of a household as discussed above. The user identifier is operative to estimate which user, of the classified users, is currently present. Together, these modules 1126, 1128 and 1130 provide audience classification information that can be used to vote (or elect not to vote) and/or generate reports (or elect not to generate reports).

As noted above, one of the audience classifications that may be used for targeting is location. Specifically, an asset provider may wish to target only users within a defined geographic zone (e.g., proximate to a business outlet) or may wish to target different assets to different geographic zones (e.g., targeting different car ads to users having different supposed income levels based on location). In certain implementations, the present invention determines the location of a particular CPE and uses the location information to target assets to the particular CPE. It will be appreciated that an indication of the location of a CPE contains information that may be considered sensitive. The present invention also creates, extracts and/or receives the location information in a manner that addresses these privacy concerns. This may also be accomplished by generalizing or otherwise filtering out sensitive information from the location information sent across the network. This may be accomplished by providing filtering or sorting features at the CPE or at the headend. For example, information that may be useful in the reporting process (i.e. to determine the number of successful deliveries within a specified location zone) may be sent upstream with little or no sensitive information included. Additionally, such location information can be generalized so as to not be personally identifiable. For example, all users on a given block or within another geographic zone (such as associated with a zip plus 2 area) may be associated with the same location identifier (e.g., a centroid for the zone).

In one implementation, logic associated with the CPE sends an identifier upstream to the headend where the identifier is cross-referenced against a list of billing addresses. The billing address that matches the identifier is then translated, for example, using GIS information, into a set of coordinates (e.g., Cartesian geographic coordinates) and those coordinates or an associated geographic zone identifier are sent back to the CPE for storage as part of its location information. Alternatively, a list may be broadcast. In this case, a list including location information for multiple or all network users is broadcast and each CPE selects its own information. Asset providers can also associate target location information with an asset. For example, in connection with a contract interface as specified below, asset providers can define target asset delivery zones. Preferably this can be done via a graphical interface (e.g., displaying a map), and the defined zones can match, to a fine level of granularity, targeted areas of interest without being limited to node areas or other network topology. Moreover, such zones can have complex shapes including discontiguous portions. Preferably the zones can then be expressed in terms that allow for convenient transmission in asset metadata and comparison to user locations e.g., in terms of grid elements or area cells.

In another implementation, individual geographic regions are associated with unique identifiers and new regions can be defined based on the union of existing regions. This can be extended to a granularity identifying individual CPEs at its most fine level. Higher levels including numerous CPEs may be used for voting and reporting to address privacy concerns.

Upon receipt of an asset option list or an asset delivery request (ADR), the CPE parses the ADR and determines whether the location of the CPE is included in the locations targeted by the asset referenced in the ADR. For example, this may involve a point in polygon or other point in area algorithm, a radius analysis, or a comparison to a network of defined grid or cells such as a quadtree data structure. The CPE may then vote for assets to be received based on criteria including whether the location of that particular CPE is targeted by the asset.

After displaying an asset option, the CPE may also use its location information in the reporting process to enhance the delivery data sent upstream. The process by which the CPE uses its location information removes substantially all sensitive information from the location information. For example, the CPE may report that an asset targeted to a particular group of locations was delivered to one of the locations in the group. The CPE in this example would not report the location to which asset was actually delivered.

Similarly, it is often desired to associate tags with asset selections. Such tags are additional information that is superimposed on or appended to such assets. For example, a tag may provide information regarding a local store or other business location at the conclusion of an asset that is distributed on a broader basis. Conventionally, such tags have been appended to ads prior to insertion at the headend and have been limited to coarse targeting. In accordance with the present invention, tags may be targeted to users in particular zones, locations or areas, such as neighborhoods. Tags may also be targeted based on other audience classification parameters such as age, gender, income level, etc. For example, tags at the end of a department store ad may advertise specials on particular items of interest to particular demographics. Specifically, a tag may be included in an asset flotilla and conditionally inserted based on logic contained within the CPE. Thus the tags are separate units that can be targeted like other assets, however, with conditional logic such that they are associated with the corresponding asset.

The present invention may use information relating to the location of a particular CPE to target a tag to a particular CPE. For example, the CPE may contain information relating to its location in the form of Cartesian coordinates as discussed above. If an asset indicates that a tag may be delivered with it or instead of it, the CPE determines whether there is, associated with any of the potential tags, a location criterion that is met by the location information contained in the particular CPE. For example, a tag may include a location criterion defining a particular neighborhood. If the CPE is located in that neighborhood, the CPE 1101 may choose to deliver the tag, assuming that other criteria necessary for the delivery of the tag are met. Other criteria may include the time available in the given break, other demographic information, and information relating to the national or non-localized asset.

As briefly note above, targeting may also be implemented based on marketing labels. Specifically, the headend may acquire information or marketing labels regarding a user or household from a variety of sources. These marketing labels may indicate that a user buys expensive cars, is a male 18-24 years old, or other information of potential interest to an asset provider. In some cases, this information may be similar to the audience classification parameters, though it may optionally be static (not varying as television users change) and based on hard data (as opposed to being surmised based on viewing patterns or the like). In other cases, the marketing labels may be more specific or otherwise different than the audience classification. In any event, the headend may inform the CPE as to what kind of user/household it is in terms of marketing labels. An asset provider can then target an asset based on the marketing labels and the asset will be delivered by CPEs where targeting matches. This can be used in audience aggregation and spot optimization contexts.

Thus, the targeted asset system of the present invention allows for targeting of assets in a broadcast network based on any relevant audience classification, whether determined based on user inputs such as a click stream, based on marketing labels or other information pushed to the customer premises equipment, based on demographic or other information stored or processed at the headend, or based on combinations of the above or other information. In this regard, it is therefore possible to use, in the context of a broadcast network, targeting concepts that have previously been limited to other contexts such as direct mail. For example, such targeting may make use of financial information, previous purchase information, periodical subscription information and the like. Moreover, classification systems developed in other contexts, may be leveraged to enhance the value of targeting achieved in accordance with the present invention.

An overview of the system has thus been provided, including introductory discussions of major components of the system, which provides a system context for understanding the operation of the matching related functionality and associated structure. This matching related subject matter is described in the remainder of this description.

II. Asset Matching

A. Overview

From the discussion above, it will be appreciated that determining classification parameters for a user and matching the classification parameters of the user to targeting parameters of an asset is useful in several contexts. First, this matching-related functionality is useful in the voting process. That is, one of the functions of the targeting system in the system described above is to receive ad lists (identifying a set of ads that are available for an upcoming spot), determining the targeting parameters for the various ads and voting for one or more ads based on how well the targeting parameters match the classification parameters of a current users. Thus, identifying the classification parameters of the current user(s) and matching those parameters to the targeting parameters is important in the voting context.

Matching related functionality is also important in the ad selection context. Specifically, after the votes from the various participating set top boxes have been processed, a flotilla of ads is assembled for a commercial break. A given DSTB selects a path through the flotilla (corresponding to a set of ads delivered by the set top box at the commercial break) based on which ads are appropriate for the user(s). Accordingly, identifying the current user classification parameters and matching those parameters to the targeting parameters is important in the ad selection context.

The matching related functionality may also be used in the reporting context. In this regard, some or all at the DSTBs provide reports to the network concerning the ads that were actually delivered. This enables the targeting system and the traffic and billing system to measure the audience for an ad so that the advertiser can be billed appropriately. Preferably, the information provided by these reports not only indicates the size of the audience but how well the audience fits the target audience for the ad. Accordingly, the system described above can provide goodness of fit information identifying how well the classification parameters of the user(s) who received the ad match the targeting parameters. The matching related functionality is also useful in this context.

In one implementation of the present invention, this matching related functionality is performed by a classifier resident at the DSTB. This classifier will be described in more detail below. Generally, the classifier analyzes a click stream, or series of remote control inputs, to determine probable classification parameters of a current user(s). The classifier also performs a matching function to determine a suitability of each of multiple candidate ads (e.g., from an ad list) for the current user(s) based on inferred classification parameters of a putative user or users. The classifier can then provide matching related information for use in the voting, ad selection and reporting contexts as described above. In the description below, this matching related information is primarily discussed in relation to the voting context. However, it will be appreciated that corresponding information can be used for ad selection and reporting. In addition, while the invention can be used in connection with targeting various types of assets in various networks, the following description is set forth in the context of targeting ads in a cable television network. Accordingly, the terms "ad" and "viewer" are used for convenience and clarity. Moreover, for convenience, though the classifier can identify multiple users, the description below sometimes refers to a singular user or viewer.

Figure 9:
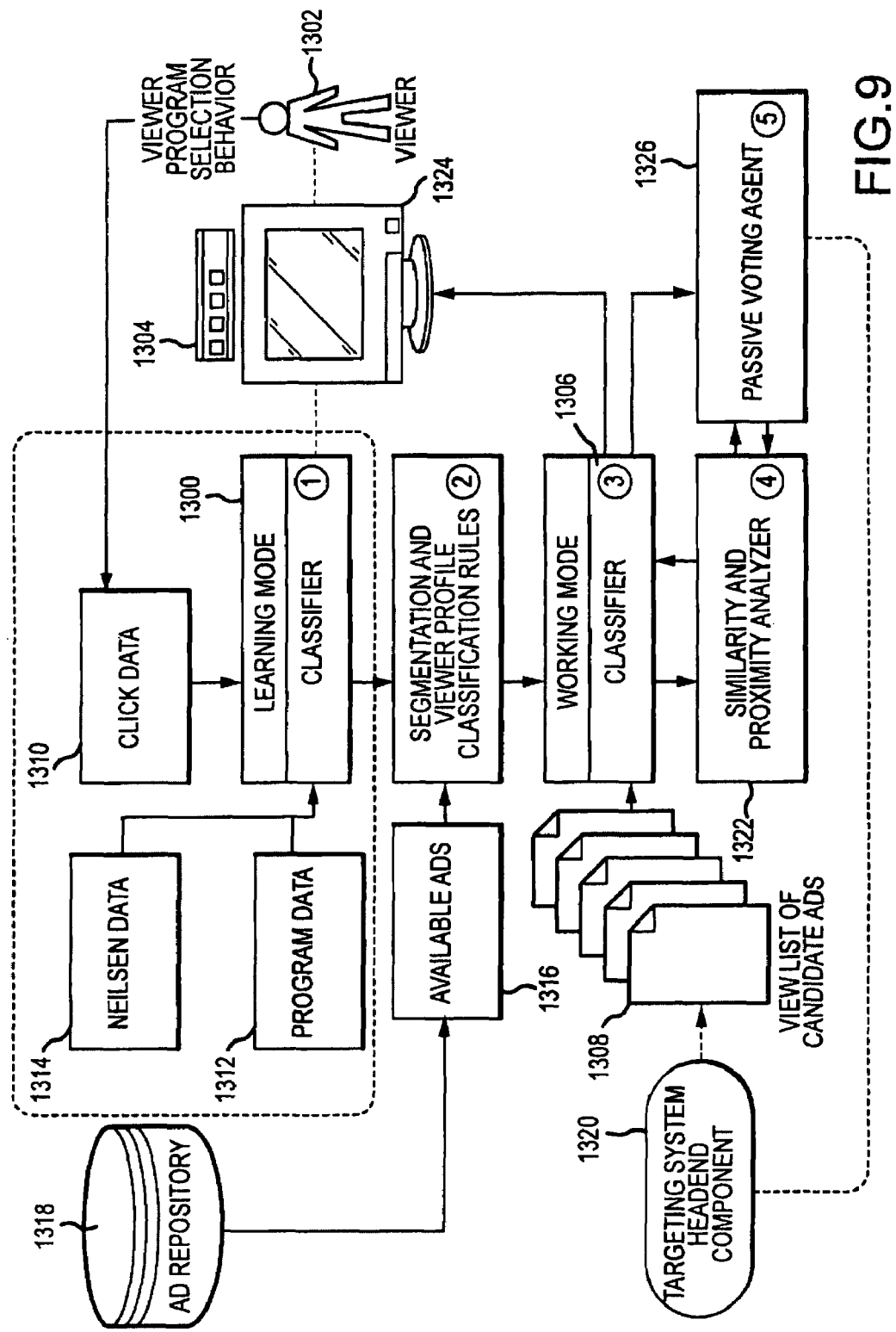
FIG. 9 illustrates an overview of a classifier process in accordance with the present invention.

The classifier generally operates in two modes: the learning mode and the working mode. It will be appreciated, however, that these modes are not fully separate. For example, the classifier continues to learn and adapt during normal operation. These modes are generally illustrated in FIG. 9. In the learning mode, the illustrated classifier 1300 monitors behavior of viewers 1302 in the audience of a given DSTB 1304 to deduce classification parameters for the viewers 1302. In this regard, an audience for a given DSTB 1304 may include a father, a mother and a child, one or more of whom may be present during a viewing session. The classification parameters may include any of the classification parameters noted above, such as gender, age, income, program preferences or the like.

As shown in FIG. 9, in the learning mode, the classifier receives inputs including click data 1310 from the user, program data 1312 (such as program guide data) from the network and Nielsen data 1314 generated by the Nielsen system. This information is processed to learn certain behaviors of the viewer, including a viewer program selection behavior. In this regard, the Nielsen data 1314 reflects the demographic composition for particular programs. The program data 1312 may include information regarding the genre, rating, scheduled time, channel and other information regarding programs. The click data 1310 reflects channels selected by a user, dwell time (how long a user remained on a given channel) and other information that can be correlated with the Nielsen data 1314 and program data 1312 to obtain evidence regarding classification parameters of the viewer. In addition, the click data 1310 may reflect frequency of channel hopping, quickness of the click process, volume control selections and other information from which evidence of viewer classification parameters may be inferred independent of any correlation to program related information. As will be discussed in more detail below, in the learning mode, the classifier 1300 begins to generate clusters of data around segments of classification parameter values (e.g., associated with conventional data groupings), thereby learning to identify viewers 1310 and classify the viewers 1302 in relation to their probable gender, age, income and other classification parameters.

Figure 10:
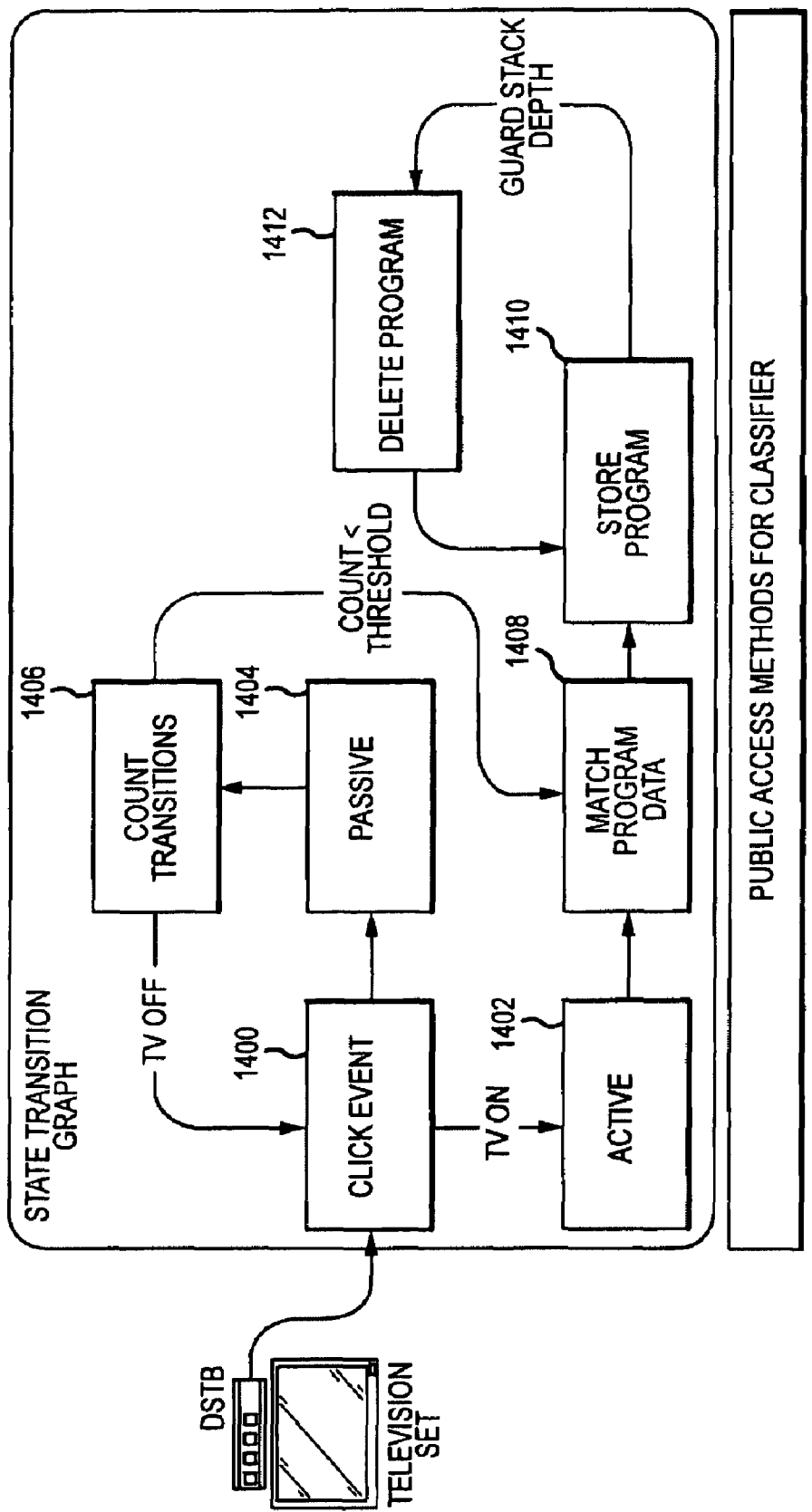
FIG. 10 is a stay transition graph illustrating a process for handling click stream data in accordance with the present invention.

The state transition functionality is illustrated in FIG. 10. State changes are triggered by events, messages and transactions. One of the important state transitions is the stream of click events 1400. Each click event 1400 represents a state transition (for example, a change from one program to another, a change in volume setting, etc.). As shown, an absence of click events 1400 or low frequency of click events may indicate that no viewer is present or that any viewing is only passive 1404. If the transition count 1406 exceeds a threshold (e.g., in terms of frequency) and the DSTB is on or active 1402, then the classifier may be operated to match program data 1408 and learn or store 1410 the program. Programs may be deleted 1412 in this regard so as not to exceed a maximum stack depth or to implement a degree of desirable forgetfulness as described above.

Referring again to FIG. 9, as the learning mode progresses, viewer identifications are developed in relation to at least two sets of characteristic information. First, a classification parameter set is developed for each discovered viewer 1302 of the DSTB audience. Second, for each discovered viewer 1302, a set of rules is developed that defines the viewing behavior over time for that viewer 1302. This is referred to below as the periodicity of the viewer's viewing habits. Thus, the classification set for each discovered viewer 1302 may identify the viewer's age, gender, education, income and other classification parameters. This information is coupled with the periodicity of the viewer's viewing habits so as to allow the classifier to match an ad with a target audience during a specific timeframe. That is, the determination by the classifier as to who is watching at a given time may be informed both by a substantially real-time analysis of viewing behavior and by historical viewing patterns of a viewer 1302. Alternatively, this process of developing classification parameter sets for discovered users may take into consideration multiple time frames, e.g., different times of day. Developing these classification parameter sets for discovered viewers as a function of time of day, e.g., on an hourly, half-hourly or other time dependent basis, has been found effective, as viewership in many households is significantly dependent on time of day.

It will be appreciated that the learning mode and working mode need not be distinct. For example, the classifier may estimate classification parameters for a current viewer 1302 even if historical periodicity data has not been developed for that viewer 1302. Similarly, even where such information has been developed in the learning mode, a current viewing audience may be continually defined and redefined during the working mode. Thus, the classifier does not require persistent storage of viewer profile information in order to function. For example, any such stored information may be deleted when the DSTB is turned off. In such a case, the classifier can readily develop classification parameters for one or more viewers when power is restored to the set top box. Moreover, the classifier may be designed to incorporate a degree of forgetfulness. That is, the classifier may optionally de-weight or delete aged information from its evolving model of audience members. In this manner, the classifier can adapt to changes in the audience composition and identify previously unknown audience members.

When sufficient viewer behavior information has been collected (which may only require a small number of user inputs), the illustrated classifier moves from the learning mode to the working mode. In the working mode, the classifier 1306 performs a number of related functions. First, it can receive ad lists 1308 for an upcoming commercial break, match the targeting parameters for the ads on that list 1308 to the classification parameters of the current viewer 1302, and vote for appropriate ads. The classifier 1306 also selects ads available in a given ad flotilla for delivery to the current user 1302. Moreover, the classifier 1306 can report goodness of fit information regarding ads delivered during one or more commercial breaks. Again, in the working mode, the classifier 1306 continues to learn through a process of stochastic reinforcement, but the classifier 1306 is deemed to have sufficient information to meaningfully estimate classification parameters of a current viewer 1302 or audience.

As noted above, in the working mode, the classifier 1306 controls the voting process by effectively ranking ads from an ad list 1308. In this regard, the illustrated working mode classifier 1306 receives information regarding available ads 1316 from an ad repository 1318. These ads 1316 are associated with targeting parameters, for example, in the form of audience segmentation and viewer profile classification rules 1320. For example, an advertiser may enter targeting parameters directly into the T & B system via the ad interface. Typically, these targeting parameters may be defined in relation to conventional audience segmentation categories. However, as discussed above, the targeting system of the present invention may accommodate different or finer targeting parameters. The working mode classifier 1306 also receives an ad list 1308 or a view list of candidate ads, as described above. Specifically, the headend targeting system component 1320 processes the inputs regarding available ads and their targeting parameters to generate the ad list 1308 for distribution to participating DSTBs.

The similarity and proximity analyzer 1322 uses the targeting parameters associated with individual ads and the classification parameters of the current user to execute matching functionality. That is, the analyzer 1322 matches an ad with at least one of the probable viewers 1302 currently thought to be sitting in front of the television set 1324. As will be described in more detail below, this is done by comparing, for example, the target age range for an ad (which may be expressed as a slightly fuzzified region) to the set representing the viewer's age (which may also be a fuzzy set). The more these two sets overlap the greater the compatibility or match. Such matching is performed in multiple dimensions relating to multiple targeting/classification parameters. This similarity analysis is applied across each candidate ad of the ad list 1308, and a degree of similarity is determined for each ad. When this process is complete, the ads in each time period can be sorted, e.g., in descending order by similarity, and one or more of the top ads may be selected for voting.

The passive voting agent 1326 is operative to select ads based on the match information. This process works in the background generally using an out of band data stream. More specifically, the illustrated voting agent 1326 selects a record or ADR for each of the candidate ads and determines for each if any viewers are likely to be present at the ad time. Additionally, the voting agent 1326 determines if any such viewer has classification parameters that acceptably match the targeting parameters for the ad. In the voting context, for each match, a vote is made for the ad. This vote is returned to the headend component 1320 where it is combined with other votes. These aggregated votes are used to generate the next generation of ad lists 1308.

An overview of the classifier system has thus been provided. The learning mode, working mode and matching functionality is described in more detail in the following sections.

B. Learning Mode Operation

Figure 11:
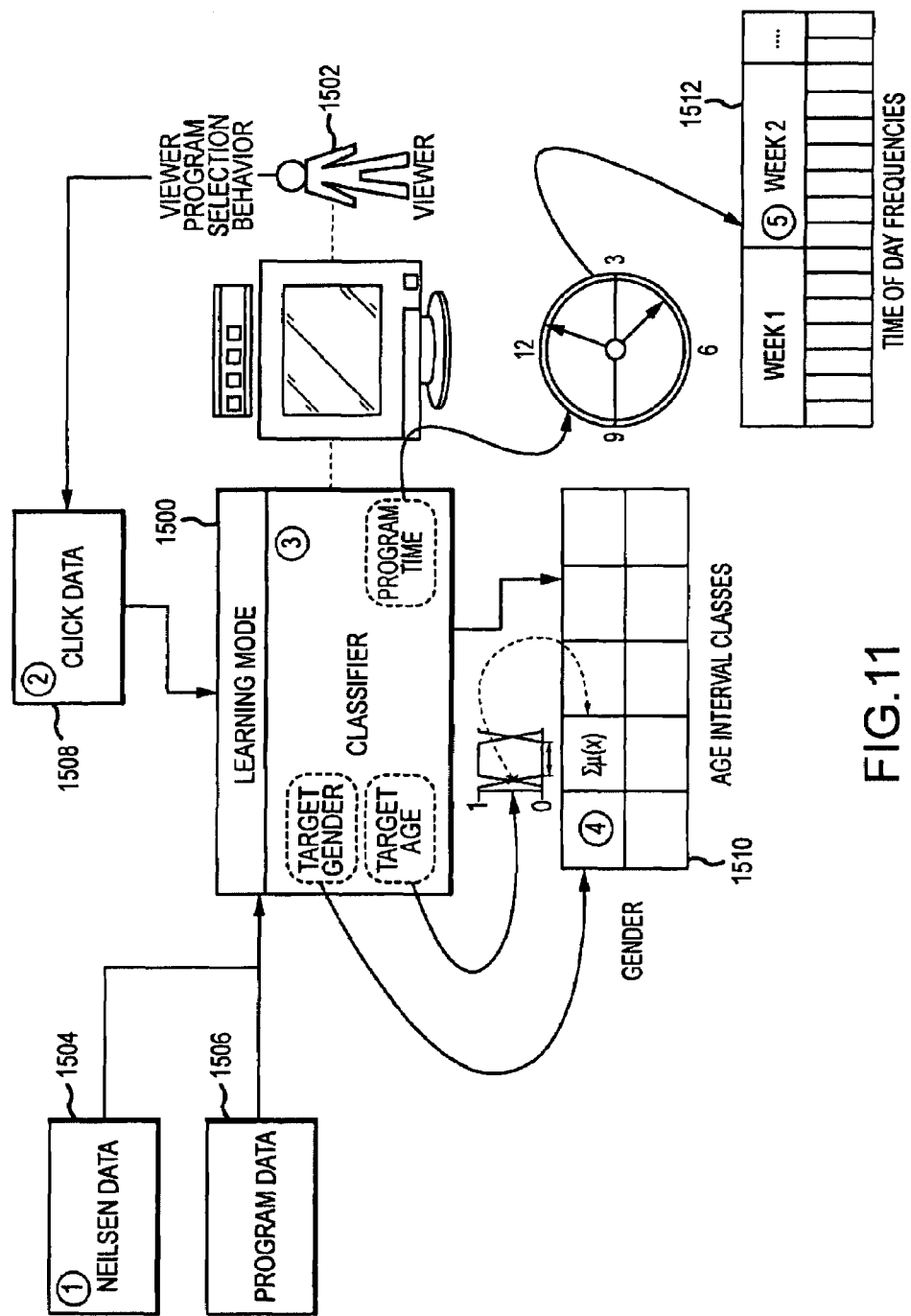
FIGS. 11-21 illustrate learning mode operation of the classifier in accordance with the present invention.

As noted above, the learning mode classifier develops classification parameter information for probable viewers as well as periodicity information for those viewers. This process is illustrated in more detail in FIG. 11. During learning mode, the classifier 1500 is constructing a statistical model of the audience. In particular, it is desirable to develop a model that enables feature separability—the ability to reliably distinguish between identified viewers of an audience. It is thus desired to have a good definition of the classification parameters of each viewer and the ability to identify the current viewer 1502, from among the identified viewers of the audience, each time the classifier needs to know who is watching the television. In FIG. 11, this process is illustrated with respect to two examples of the classification parameters; namely, target gender and target age.

As discussed above, the learning mode classifier 1500 receives inputs including programming viewing frequency (or demographic) data from Nielsen, BBM or another ratings system (or based on previously reported information of the targeted advertising system) 1504, program data 1506 and click data 1508. Based on this data, the classifier 1500 can determine which program, if any, is being viewed at a particular time and what that indicates regarding probable classification parameters of a viewer. Additionally, the click data 1508, since it is an event stream, may indicate the level of focus or concentration of the viewer 1502 at any time and may provide a measure of the level of interest in a particular program. The click data 1508 also allows the classifier 1500 to determine when the DSTB set is turned off and when it is turned on.

The learning mode classifier 1500 fuses the incoming data through a set of clustering and partitioning techniques designed to uncover the underlying patterns in the data. The goal in this regard is to discover the number of probable viewers, build a classification parameter set for each viewer and determine the viewing habits of each viewer over time (or to develop classification parameter sets for likely viewers as a function of time). This information allows the classifier 1500 to determine what kind of audience probably exists at the delivery time for a specific ad. In the illustrated example, this learning process involves the development of two classifier modules—the age and gender classifier module 1510 and the viewing behavior or periodicity classifier module 1512. The periodicity classifier 1512 accumulates and reinforces the results of the age and gender classification module across time. A sequence of age interval classes 1510 are stored across an independent axis representing the time of day and day of week that that evidence is collected. This time axis is used to determine the time of day that each individual detected in the age and gender classifier module 1510 tends to watch television.

The gender and age classifier module 1510 gathers evidence over time as to probable viewers. Once sufficient evidence is collected, it is expected that the evidence will cluster in ways that indicate a number of separate audience members. This is at once a fairly simple and complex process. It is simple because the core algorithms used to match viewing habits to putative age and gender features are well understood and fairly easy to implement. For example, it is not difficult to associate a program selection with a probability that the viewer falls into certain demographic categories. On the other hand, it is somewhat complex to analyze the interplay among parameters and to handle subtle phenomena associated with the strength or weakness of the incoming signals. In the latter regard, two parameters that affect the learning process are dwell time and Nielsen population size. The dwell time relates to the length of time that a viewer remains on a given program and is used to develop an indication of a level of interest. Thus, dwell time functions like a filter on the click stream events that are used in the training mechanism. For example, one or more thresholds may be set with respect to dwell time to attenuate or exclude data. In this regard, it may be determined that the classifier does not benefit from learning that a viewer watched a program if the viewer watched that program for less than a minute or, perhaps, less than 10 seconds. Thresholds and associated attenuation or exclusion factors may be developed theoretically or empirically in this regard so as to enhance identification accuracy.

Also related to dwell time is a factor termed the audience expectation measure. This is the degree to which, at any time, it is expected that the television (when the DSTB is turned on) will have an active audience. That is, it is not necessarily desirable to have the classifier learn what program was tuned in if nobody is in fact watching. The audience expectation measure can be determined in a variety of ways. One simple measure of this factor is the number of continuous shows that has elapsed since the last channel change or other click event. That is, as the length of time between click events increases, the confidence that someone is actively watching decreases. This audience expectation measure can be used to exclude or attenuate data as a factor in developing a viewer identification model.

Nielsen marketing research data is also useful as a scaling and rate-of-learning parameter. As noted above, this Nielsen data provides gender and age statistics in relation to particular programs. As will be discussed in more detail below, click events with sufficient dwell time are used to accumulate evidence with respect to each classification parameter segment, e.g., a fuzzy age interval. In this regard, each piece of evidence effectively increments the developing model such that classification parameter values are integrated over time. How much a given fuzzy parameter set is incremented is a function of the degree of membership that a piece of evidence possesses with respect to each such fuzzy set.

Thus, the degree of membership in a particular age group is treated as evidence for that age. However, when the program and time is matched with the Nielsen data, the gender distribution may contain a broad spectrum of viewer population frequencies. The dwellage percentage of the audience that falls into each age group category is also evidence for that age group. Accordingly, the amount that a set is incremented is scaled by the degree of membership with respect to that set. Thus, for example, if few viewers of an age category are watching a program, this is reflected in only a small amount of evidence that the viewer is in this age group.

The illustrated learning mode classifier 1500 also encompasses a periodicity classifier module 1512. As the classifier 1500 develops evidence that allows for determining the number of viewers in an audience of a DSTB and for distinguishing between the viewers, it is possible to develop a viewing model with respect to time for each of these viewers. This information can then be used to directly predict who is likely to be watching at the time of ad delivery. There are a number of ways to build the periodicity model, and this can be executed during the learning mode operation and/or the working mode operation. For example, this model may involve mapping a viewer to their pattern. Alternatively, a pattern may be discovered and then matched to a known viewer. In the illustrated implementation, the latter viewer-to-pattern approach is utilized. As will be understood from the description below, this approach works well because the properties that define the periodicity are fuzzy numbers. The match can therefore use the same kind of similarity function that is used to match viewers to targeting parameters of ads.

The discussion above noted that viewers are identified based on integrating or aggregating evidence in relation to certain (e.g., fuzzy) sets. This process may be more fully understood by reference to FIG. 12. In this case, which for purposes of illustration is limited to discovery of age and gender, this involves a 2×M fuzzy pattern discovery matrix. The two rows are gender segmentation vectors. The M columns are conventional age intervals used in ad targeting. These age intervals are overlaid with fuzzy interval measures. In the illustrated example, the classifier is modeled around certain age intervals (12-17, 25-35, 35-49) because these are industry standard segmentations. It will be appreciated, however, that specific age groups are not a required feature of the classifier.

Figure 12:
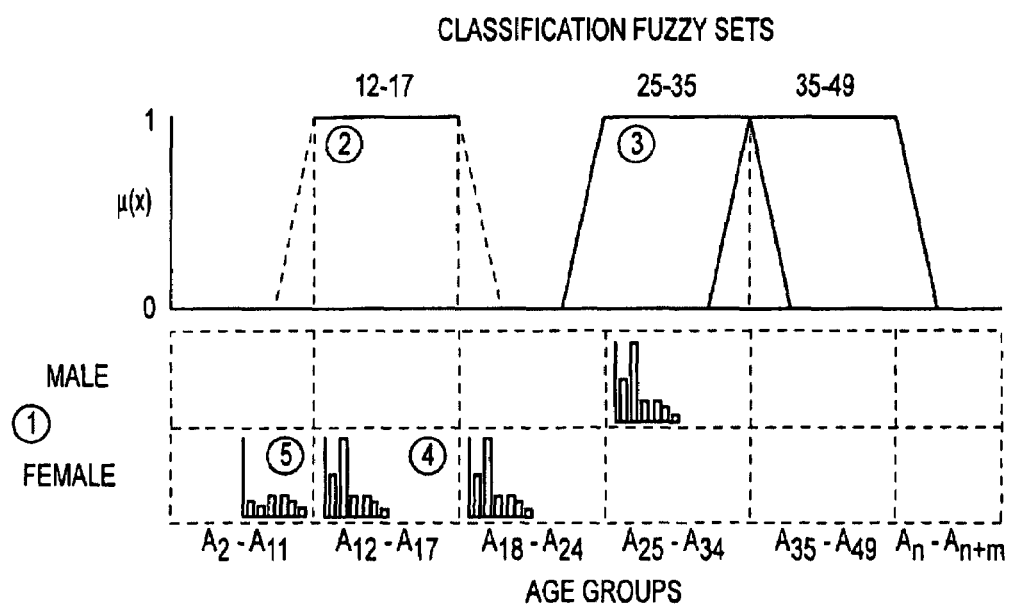

The fuzzy intervals are represented by the trapezoidal fuzzy set brackets that illustrate a certain amount of overlap between neighboring age intervals. This overlap may improve discrimination as between different age ranges. The bars shown on the matrix reflect the accumulation of evidence based on a series of click events. As can be seen in the matrix of FIG. 12, over time, this evidence tends to cluster in a fashion that indicates discrete, identifiable viewers associated with different classification parameters.

Figure 13:
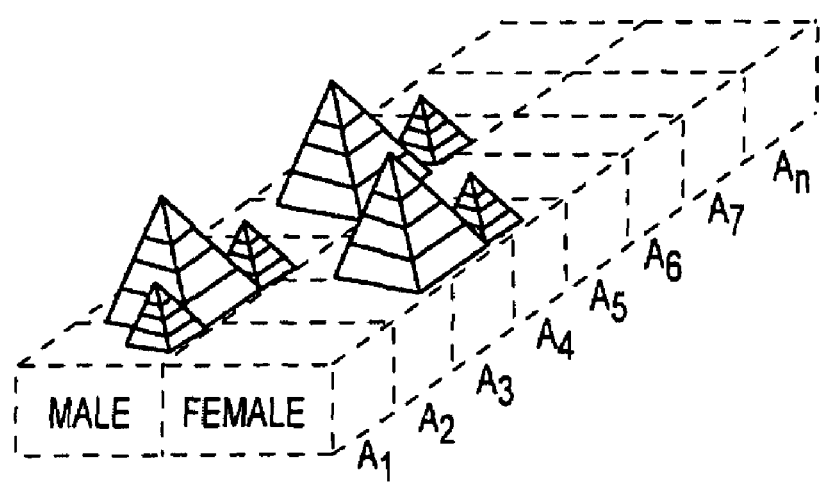
Figure 14:
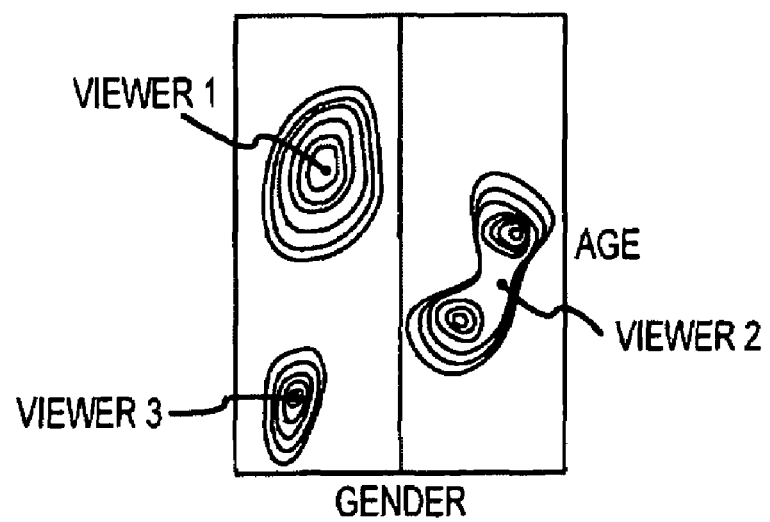

This is further illustrated in FIG. 13. In the example of FIG. 13, this process of accumulating evidence to identify discrete viewers of an audience is depicted in three-dimensional graphics. Thus, the result of the learning process is a collection of gradients or hills or mountains in the learning matrix or multi-dimensional (in this case, two-dimensional) feature terrain. In this case, the higher hills or "mountains" with their higher gradient elevations provide the best evidence that their site in the learning matrix is the site of a viewer. The hills are constructed from the counts in each of the cells defined by the classification parameter segmentation (e.g., age groups). The greater the count, the higher the hill and, consequently, the more certain it is that the characteristics correspond to a viewer of the audience. Viewed from above, the gradients and their elevations form a topological map, as shown in FIG. 14. The concentration and height of the contour lines reflect a clustering that suggests discrete and identifiable viewers. Thus, the map of FIG. 14 reflects three probable viewers identified from a learning process. It is noted that the fuzzy terrain mapping, which allows certain degree of overlap between surrounding age groups, provides a more refined estimate of the actual classification parameter values of a viewer. That is, an interpolation of evidence in adjacent fuzzy sets enables an estimation of an actual parameter value that is not limited to the set definitions. This interpolation need not be linear and may, for example, be executed as a center of gravity interpolation. That takes into account gradient height in each fuzzy set as well as a scaled degree of membership of the height in the set.

The process for applying evidence to the terrain may thus result in a fuzzified terrain. That is, rather than simply applying a "count" to a cell of the terrain based on determined classification parameter values, a count can effectively be added as terrain feature (e.g., a hill) centered on a cell (or on or near a cell boundary) but including residual values that spill over to adjacent cells. The residual values may spill over onto adjacent cells in multiple dimensions. In one implementation, this effect is defined by a proximity calculation. The result of applying evidence to the terrain in a fuzzified fashion is potentially enhanced user definition as well as enhanced ability to distinguish as between multiple users.

The proximity algorithm and terrain seeding noise reduction filtering can be illustrated by reference to an example involving three classification parameter dimensions; namely, gender, age and time of day. The feature terrain may be viewed as being defined by a cube composed of a number of sub-cubes or grains. For example, the terrain cube may be composed of 7680 grains—2×80×48 grains, corresponding to two gender, 80 age and 48 half-hour time categories. Each of the grains can be populated with a reference or noise value. For example, the noise values can be derived from a statistical analysis of the expected viewers at each age, gender and time measured over all available programming channels for which Nielson, BBM or another ratings system have observers (or based on previously reported information of the targeted advertising system). The noise may be drawn from a distribution of these viewers from a suitable function (e.g., developed empirically or theoretically) and may or may not be as simple as an average or weighted average. In any case, it is this noise bias that cancels out a corresponding randomness in the evidence leaving a trace or residue of evidence only when the evidence is repeatedly associated with an actual viewer whose behavior matches the (age, gender, time) coordinates of the terrain.

It will be appreciated that the grain definition and population of the grains with reference values or noise is not limited to the granularity of the source of the reference values, e.g., the standard Neilson categories. Rather, the reference values can be interpolated or estimated to match the defined grain size of the terrain cube. Thus, for example, Neilson source data may be provided in relation to 16 age gender groups whereas the terrain cube, as noted above, may include 2×80 corresponding grains (or columns of grains where the column axis corresponds to the time dimension). Various mathematical techniques can be used in this regard. For example, the age distribution can be fitted to a curve or function, which can then be solved for each age value. The corresponding values are then applied to seed the terrain.

Evidence is the statistical frequency of viewers of a particular age and gender who are watching a television program (which is playing at a particular time). The combination of Neilson frequencies and the program time generates 16 pieces of evidence for each time period (there are 8 male and 8 female age groups with their viewing frequencies). Finding out which of these 16 pieces of evidence corresponds to the actual viewer is the job of the statistical learning model underlying the classifier. Fundamental to making this decision is the methodology used to add evidence to the terrain. This involves first applying the noted noise filter as follows:

$$d = f(a,g,t) - r(a,g,t) \qquad (1)$$

where (f) is the observed evidence and (r) represents the noise for that age, gender and time. This value (d) will be either positive or negative. The result is added to the terrain (t) on a grain-by-grain basis:

$$t(a,g,t)=t(a,g,t)+d \qquad (2)$$

If the evidence is being drawn randomly from the incoming statistics, then the number of positive and negative residuals (d) will be approximately equal, and the total sum of the terrain value (t) at that point will also be zero. If, however, the evidence is associated with an actual viewer, then we would expect a small but persistent bias in the frequency statistics to accumulate around that real viewer. Over time, this means that residual (d) will be positive more often than negative and that the contour at the terrain cube will begin to grow. As more evidence is added, the contour grows as a small hill on the terrain. This small hill is an actual viewer (actually, because of the time axis, viewers appear as a ridge of connected hills, somewhat like a winding mountain range).

But because this is a statistical learning model, and because reinforcement is sporadic (due to inconsistent viewer behaviors), it is useful to fuzzify or spread the evidence, e.g., to surround each emerging contour with a small bit of probabilistic evidence that will help us define an actual viewer's behavior in the time dimension. To do this, we take the evidence (d) and use it to populate adjoining grains. This is done in a series of concentric circles out from the target terrain grain. Thus, for the first set of adjoining grains (in all directions in age, gender and time), we add x1=d*0.10, for the next, x2=x1*0.05, for the next, x3=x2*0.025, etc., until the multiplier fall below some threshold. It will be appreciated that these multipliers are simply examples and other values, derived empirically or theoretically, can be used. As an example, if d=100, then the proximity values would look something like this,

| 0.0125 | 0.0125 | 0.0125 | 0.0125 | 0.0125 | 0.0125 | 0.0125 |
|--------|--------|--------|--------|--------|--------|--------|
| 0.0125 | 0.5    | 0.5    | 0.5    | 0.5    | 0.5    | 0.0125 |
| 0.0125 | 0.5    | 10     | 10     | 10     | 0.5    | 0.0125 |
| 0.0125 | 0.5    | 10     | 100    | 10     | 0.5    | 0.0125 |
| 0.0125 | 0.5    | 10     | 10     | 10     | 0.5    | 0.0125 |
| 0.0125 | 0.5    | 0.5    | 0.5    | 0.5    | 0.5    | 0.0125 |
| 0.0125 | 0.0125 | 0.0125 | 0.0125 | 0.0125 | 0.0125 | 0.0125 |

As can be seen, the value at each outward layer is based on a fraction of the previous layer (not the original value). Of course, in a real terrain, the original value is very small, so the values in each outward cell become very, very small very, very quickly. Yet, over time, they provide enough additional evidence to support the growth of a valid contour site.

The proximity algorithm that fills out the terrain, also provides a quick and effective way of discovering who is viewing the television associated with the DSTB. The ridge of contours or hills associated with a viewer wanders across the three-dimensional terrain cube. These hills are smoothed out (made "fatter," so to speak) over the terrain by the addition of the minute bits of partial evidence laid down during the building of the terrain (the x1, x2, x3, etc., in the previous section). To find the viewer, the hills over the gender/age axes at a particular time can be summed and averaged. The viewer is the hill with the maximum average height. Optionally, a proximity algorithm can be used in integrating these hills. For example, when determining the height value associated with a given grain, a fraction of the height of adjacent grains and a small fraction of the next outward layer of grains (etc.) may be added. This is somewhat analogous to the mountain clustering algorithm discussed herein and may be used as an alternative thereto.

As noted above, these terrains may be developed as a function of time of day. For example, the data may be deposited in "bins" that collect data from different times of day on an hourly, half-hourly or other basis (e.g., irregular intervals matching morning, daytime, evening news, primetime, late night, etc.). Again, the process of applying the evidence to these bins may be fuzzified such that evidence spills over to some extent into adjacent bins or cells in the time and other dimensions. Evidence may be integrated in these bins over multiple days. The resulting terrains may be conceptualized as multiple terrains corresponding to the separate timeframes or as a single terrain with a time dimension. This functionality may be implemented as an alternative to the separate periodicity analysis described below.

Figure 15:
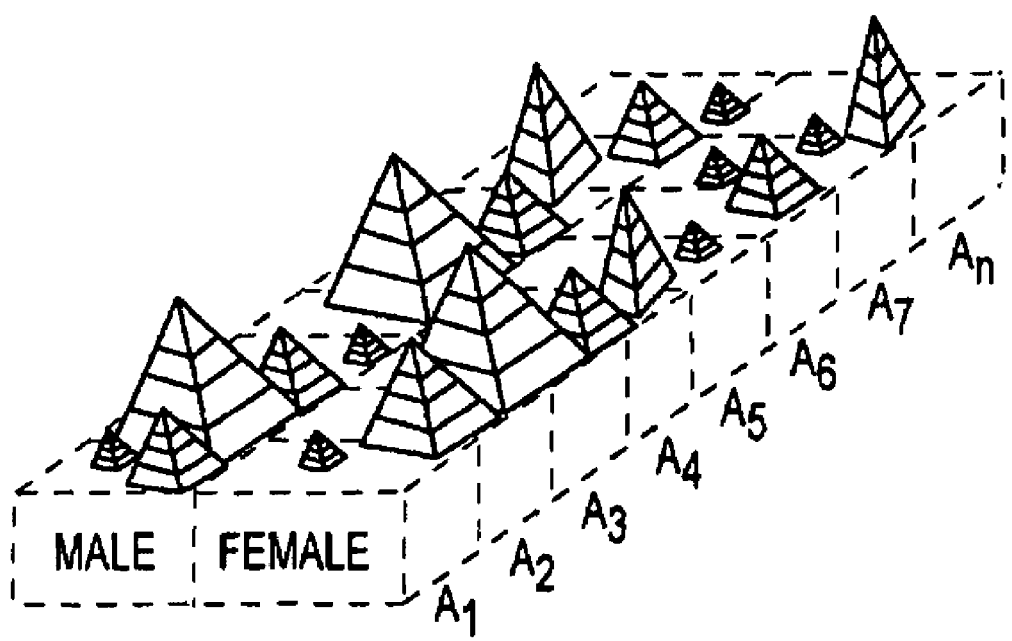

The previous examples have reflected relatively clean datasets that were easy to interpret so as to identify discrete viewers and their associated classification parameters. In reality, real world data may be more difficult to interpret. In this regard, FIG. 15 illustrates a more difficult dataset in this regard. In particular, the feature terrain of FIG. 15 does not readily yield interpretation as to the number of viewers in the audience or their specific classification parameters. Any number of factors may result in such complexity. For example, the remote control may be passed between different audience members, the click stream may be influenced by other audience members, a click event of significant duration may reflect distraction rather than interest, a viewer may have a range of programming interests that do not cleanly reflect their classification parameters, etc.

In order to resolve complicated data such as illustrated in FIG. 15, the classifier implements processes of noise removal and renormalization of the gradient terrain. The goal is to find the actual centers of evidence so that the number of viewers and their classification parameters can be accurately identified. One type of process that may be implemented for removing or attenuating noise involves consideration of reference values, e.g., average values for all events at that time, taken in relation to the whole audience. For example, the terrain may be seeded with reference values or the reference values may be considered in qualifying or rejecting data corresponding to individual events. In one implementation, data is compared to reference values on an event-by-event basis to qualify data for deposit into the bins for use in developing the terrain. This has the effect of rejecting data deemed likely to represent noise. In effect, the reference values are subtracted from evidence as it is applied to the terrain, thus impeding the process of constructing terrain features so that terrain features substantially only rise as a result of persistent or coherent accumulation of evidence likely reflective of an actual user, and spurious peaks are avoided. Selecting the reference values as average values, weighted average values or some other values related to the observation context (but substantially without information likely to bias the user identification and definition problem) has the effect of scaling the filter effect to properly address noise without inhibiting meaningful terrain construction. Additionally, data may be qualified in relation to a presence detector. As noted above, presence may be indicated by reference to the on/off state of the DSTB and/or by the absence or infrequency of inputs over a period of time. Data acquired when the presence detector indicates that no user is deemed "present" may be excluded.

Figure 16:
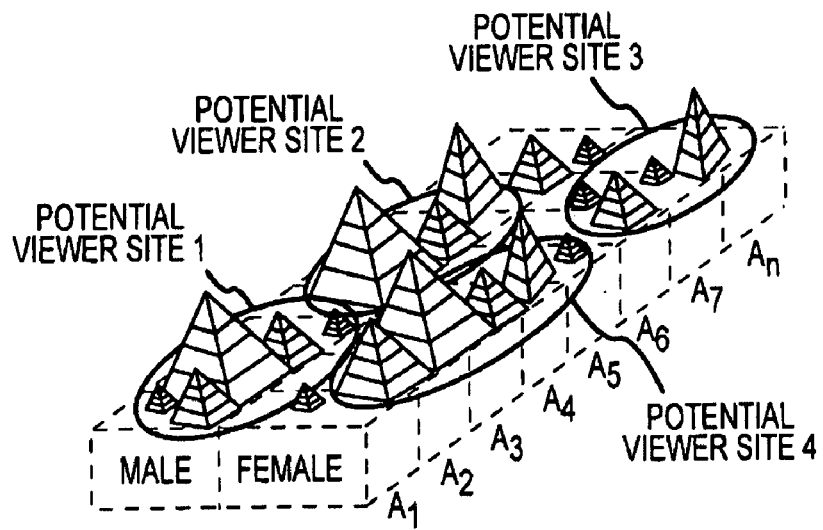
Figure 17:
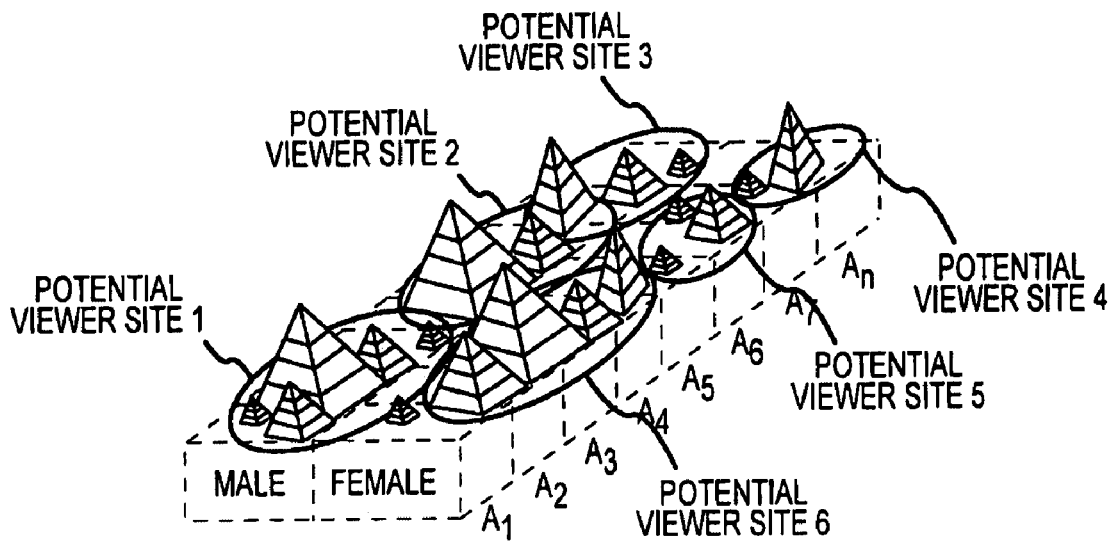

Noise removal may further involve eliminating false centers and sporadic evidence counts without disturbing the actual centers to the extent possible. In this regard, FIG. 16 illustrates a possible identification of viewer sites with respect to the data of FIG. 15. FIG. 17 illustrates an alternative, also potentially valid, interpretation of the data of FIG. 15. The classifier implements an algorithm designed to determine which of competing potentially valid interpretations is most likely correct. This algorithm generally involves gradient deconstruction. The deconstruction process is an iterative process that finds gradient centers by first removing low-level interference noise (thus revealing the candidate hills) and then measuring the compactness of the distribution of hills around the site area. In this regard, a mountain clustering algorithm can be implemented to iteratively identify peaks, remove peaks and revise the terrain. The affect is to identify cluster centers and to smooth out the hilliness between cluster centers so that the cluster centers become increasingly distinct. The remaining sites after the feature terrain is processed in this regard are the sites of the putative viewers.

Figure 18:
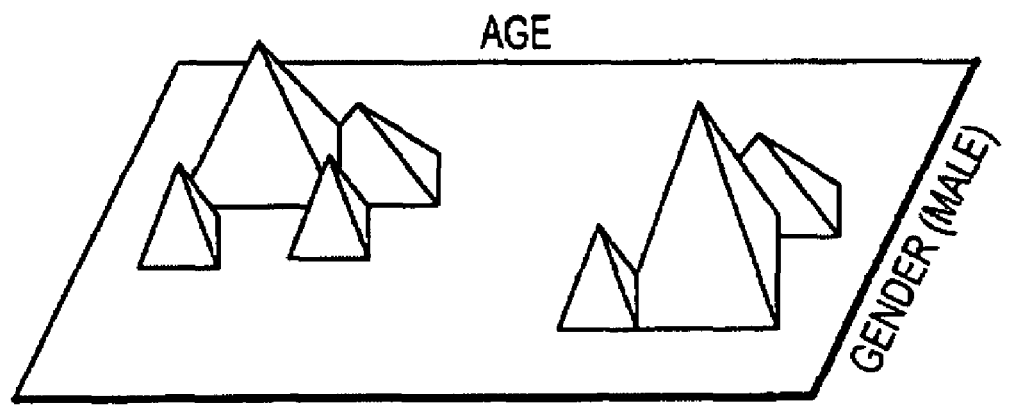
Figure 19:
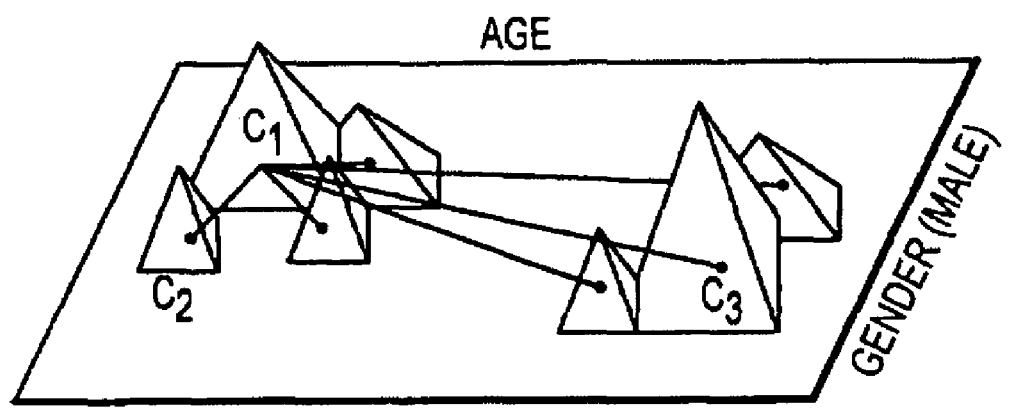
Figure 20:
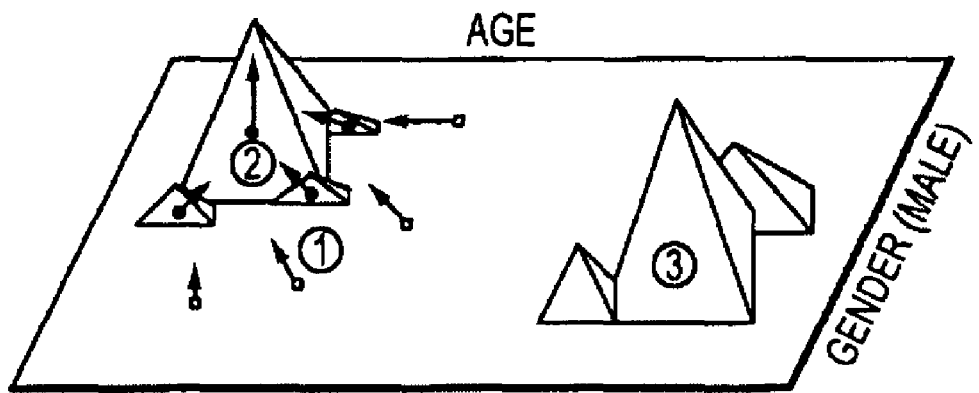
Figure 21:
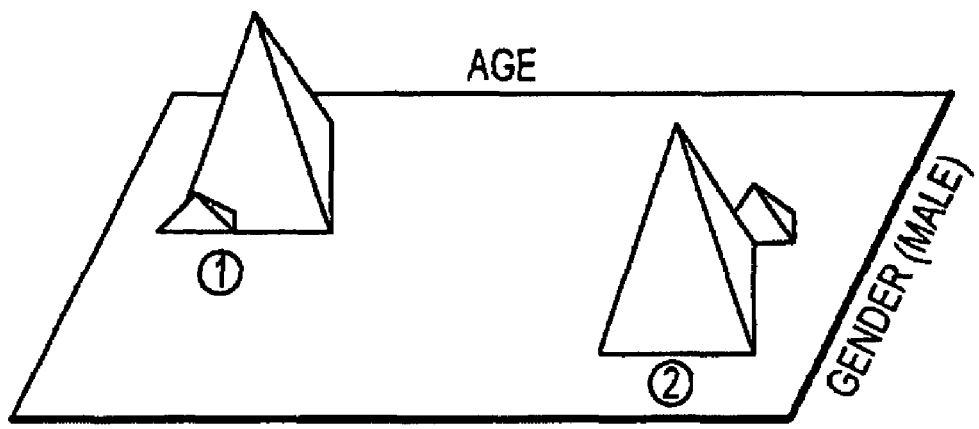

This mountain clustering and noise reduction functionality may be further understood by reference to FIGS. 18-21. FIG. 18 shows a learning matrix or feature terrain with a set of gradients scattered over the surface. In the first iteration of the algorithm, as shown in FIG. 19, gradient C1 is identified as the maximum mountain. The distance from C1's center of gravity to the centers of each gradient on the surface (e.g., C2, C3, etc.) is measured. The degree of mountain deconstruction on each gradient is inversely proportional to the square distance between C1 and each of the other clusters. This inverse square mechanism localizes nearly all of the mountain deconstruction to the neighborhood of C1. Thus, FIG. 20 shows significant deconstruction of features proximate to C1 as a result of this first iteration. This causes the general perimeter of the emerging site at C1 to contract. The contraction also involves the assimilation of small gradients, hence the height of C1 is increased, and the adjacent hilliness is reduced. At the same time, the height of C3 is barely changed and its set of satellite gradients has not yet begun to be assimilated. The process is then repeated with respect to C3. After a number of iterations, the final sites begin to emerge and stabilize. FIG. 21 shows the terrain after most of the smaller gradients have been assimilated. The resulting processed terrain or feature space has well defined gradients at each putative viewer site. The mountain clustering process thus essentially removes much ambiguity.

A similar process is performed with respect to the periodicity analysis. Specifically, a periodicity learning matrix is created and updated in a manner analogous to construction and updating of the viewer classification parameter matrix and its conversion to the feature terrain. In this case, the periodicity terrain produces a set of gradients defining, by their height and width, the expectation that the viewer is watching television at that point in time. A matching algorithm can then be used to match a periodicity pattern to one of identified viewers.

C. Working Mode Operation

When the classifier has been sufficiently trained, it moves from learning mode operation to working mode operation. As noted above, these modes are not entirely distinct. For example, the classifier can perform estimations of classification parameters while still in the learning mode, and the classifier continues to learn during the working mode. However, as described above, the learning mode is a gradual process of collecting evidence and measuring the degree to which the viewer sites are discernable in the learning matrix. Thus while the classifier can operate quickly using default values, working mode operation reflects a determination that the viewers of an audience have been identified and classified with a high degree of confidence.

Figure 22:
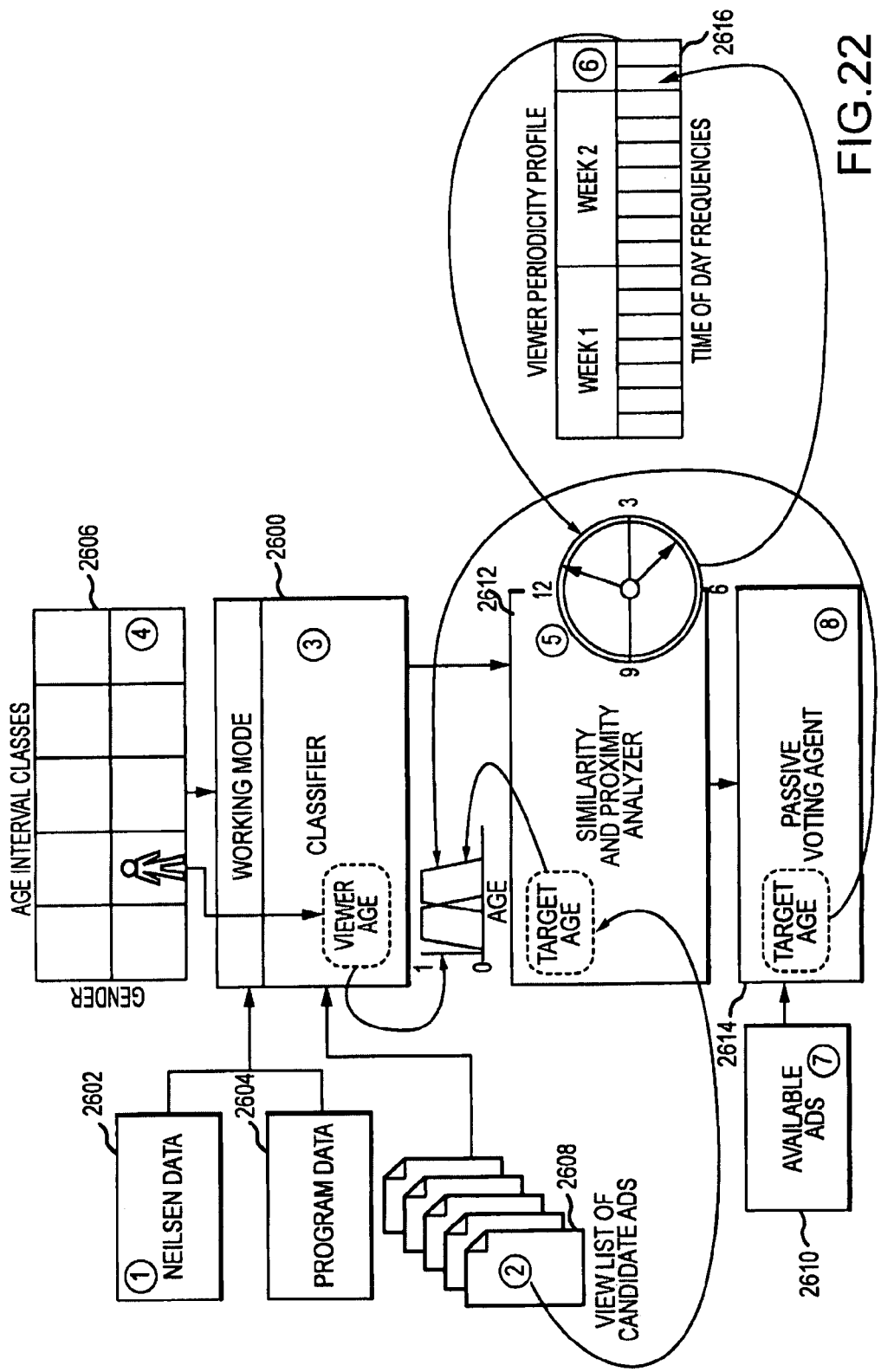
FIGS. 22-26 illustrate working mode operation of the classifier in accordance with the present invention.

The basic operation of the working mode classifier is illustrated in FIG. 22. In the working mode, the classifier 2600 has access to the developed feature terrain, as discussed above, as well as to a similarity function that is operative to match targeting parameters to the classification parameters as indicated by the viewer identification. More specifically, Nielsen data 2602 and program data 2604 continues to be fed into the classifier 2600 in the working mode to support its continued learning process that essentially runs in the background. The classifier 2600 then receives an ADR from the ad list 2608. The ADR is initially filtered for high level suitability and then, if the ADS is still available for matching analysis, selects each viewer and each classification parameter for each viewer for comparison. Thus, FIG. 22 depicts the process of accessing a classification matrix 2606 of a viewer. In this case, the matrix 2606 is a two-dimensional matrix limited to gender and age classification parameters. In practice, any number of classification parameters may be supported.

The retrieved classification parameter values of the user and the targeting parameters of the ad are then provided to the similarity and proximity analyzer 2612 where they are compared. This function returns a degree of similarity for each attribute. The total compatibility or relative compatibility rank (RCR) is given as:

$$RCR = \frac{\sum_{i=1}^{N} s_i \times w_i}{\sum_{i=1}^{N} w_i}$$

Where, $s_i$ is the similarity measurement for the $i^{th}$ property $w_i$ is the weighting factor for the $i^{th}$ property. If weighting (priority or ranking) is not used, the default, w=1, means that weights do not affect the ranking.

Through this process, an ad may be found to be compatible with one or more viewers of an audience. For example, such compatibility may be determined in relation to an RCR threshold value. Thus, when an ad is found to be compatible with one or more of the viewers, the periodicity analyzer 2616 is called to see if the viewer is likely to be present at the target ad insertion time. If the viewer is unlikely to be watching, the degree of this time constraint is used to adjust the RCR. Accordingly, the RCR is recomputed as:

$$RCR = \frac{\sum_{i=1}^{N} s_i \times w_i}{\sum_{i=1}^{N} w_i} \times l(pT)$$

Where, l( ) is the likelihood estimating function from the periodicity analysis. This function returns a fuzzy degree of estimate in the interval [0,1] (which is actually a degree of similarity between the target time period and each of the viewer's active time periods)

$p^T$ is the target time period

Accordingly, the RCR will have a high value if there is both a high degree of match between the classification parameters of a user and the targeting parameters of the ad, and there is a high probability that the user will be watching at the ad delivery time. This formula further has the desirable quality that a low compatibility where the viewer is not watching, even if the viewer's classification parameters are a very good match for a given ad.

The voting agent 2614 is closely connected to the operation of the working mode classifier 2600. In particular, the validity of the vote is highly dependent on the ability to correctly identify a viewer's classification parameters and viewing habits. Thus, the voting agent 2614 essentially works in the same way as the view list ranking. Specifically, an ADR is sent to the voting agent 2614, the voting agent 2614 extracts the ads targeting parameters and calls the classifier 2600, which returns the RCR for this ad. In this manner, ads are not only voted on but also delivered based on a matching process.

D. Matching Functionality

The similarity function used to execute the various matching functionality as discussed above can be understood by reference to FIGS. 23-26. Thus, as noted above, when an ADR is received at the classifier to be ranked, the targeting parameters and any ad constraints are embedded in the ADR. The ADR may also indicate an "importance" of the ad. For example, such importance may be based on the ad pricing (e.g., CPM value) or another factor (e.g., a network operator may specify a high importance for internal marketing, at least for a specified geographic area such as where a competing network is, or is becoming, available). The classifier also has access to the classification parameters of the various viewers in the audience, as discussed above. The first step in the matching process is applying a similarity function, e.g., a fuzzy similarity function, to each of the classification parameters and targeting parameters. The similarity function then determines the degree to which a targeting parameter is similar to or compatible with a classification parameter. The weighted average of the aggregated similarity of values for each of the classification/targeting parameters is the base match score.

Figure 23:
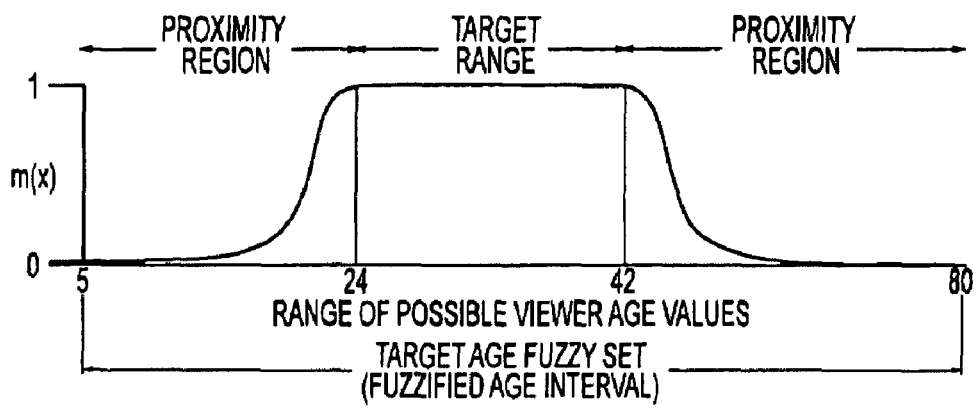
Figure 24:
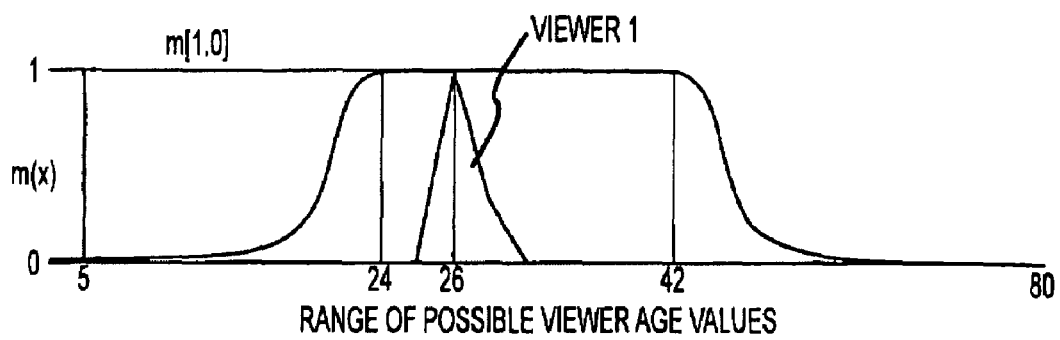
Figure 25:
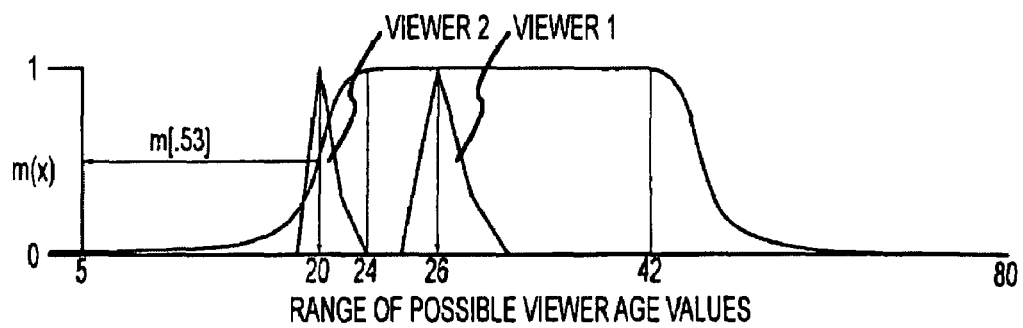

More specifically, the illustrated classifier fuzzifies the targeting parameter and finds the degree of membership of the corresponding classification parameter of the user in this fuzzified region. Thus, as shown in FIG. 23, the targeting parameters for an ad may specify a target age range of 24-42 years of age. As shown in FIG. 23, this targeting parameter is redefined as a fuzzy set. Unlike rigid sets, the fuzzy set has a small but real membership value across the entire domain of the classification parameter (age in this case). The membership function means that the matching process cannot automatically identify and rank classification parameters values that lie near but, perhaps, not inside the target range. As an example, FIG. 24 shows a putative viewer with an inferred age of 26. In this case, the viewer sits well inside the target age range. The degree of membership is therefore 1.0, indicating a complete compatibility with the target age. In fact, any age that is within the target age range will return a matching membership of 1.0. However, the matching process can also deal with situations where retrieved classification parameters do not match the targeting parameter range. FIG. 25 illustrates the case where a viewer is estimated to be 20 years old and is therefore outside of the rigid target range boundaries. If the classifier had Boolean selection rules, this viewer would not be selected. The nature of the fuzzy target space, however, means that viewer 2 is assigned a similarity or compatibility value greater than zero, in this case 0.53. The classifier now has the option of including viewer 2, knowing that the viewer is moderately compatible with the target range.

Figure 26:
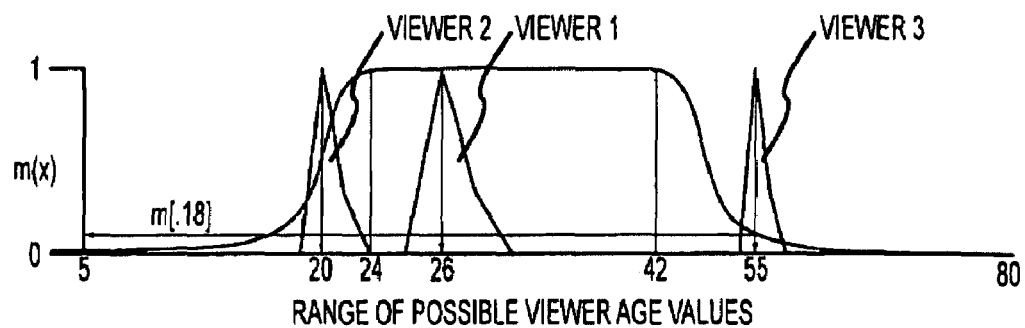
Figure 27:
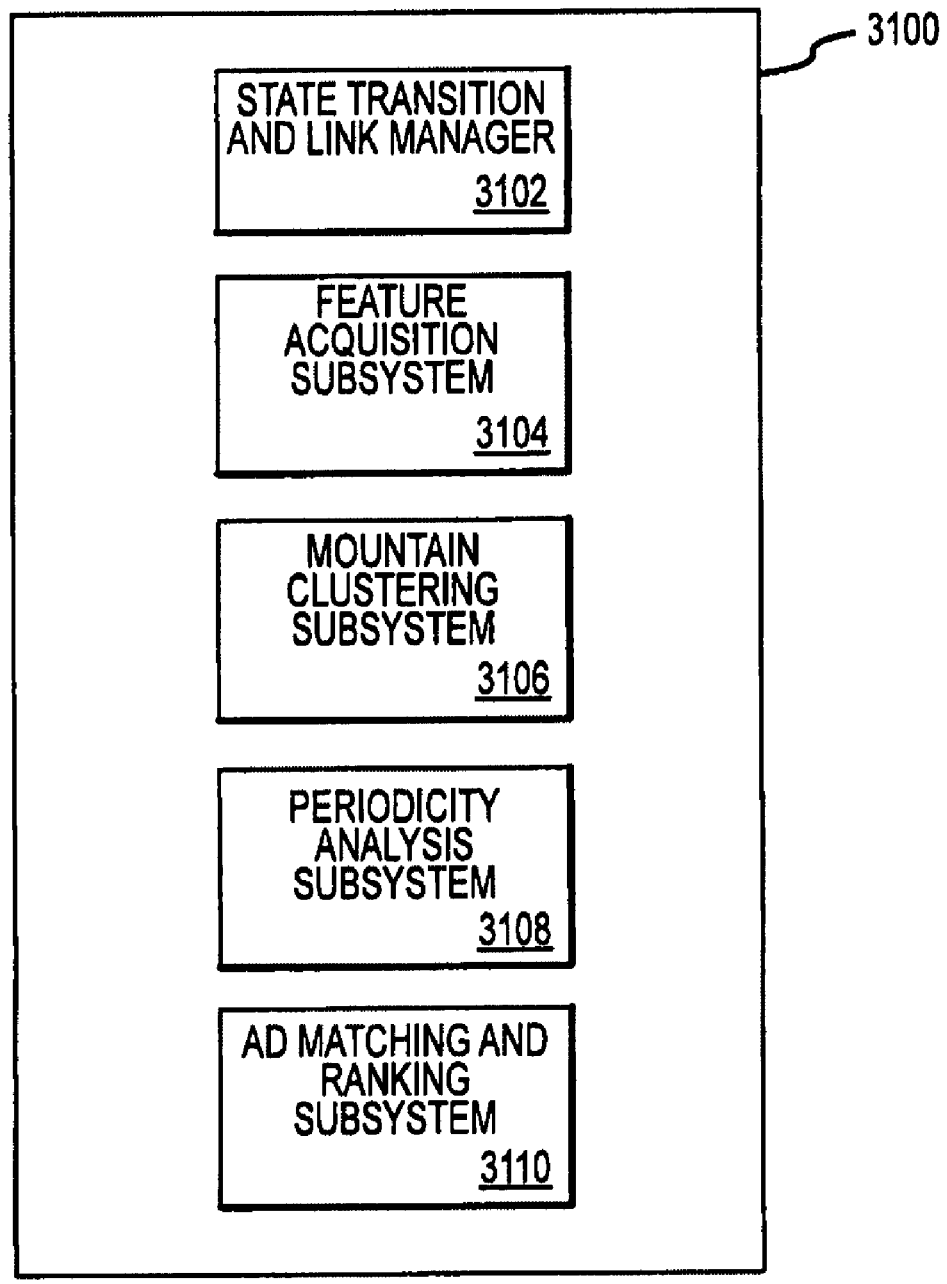
FIG. 27 is a block diagram illustrating the basic functional components of the classifier in accordance with the present invention.

FIG. 26 shows a slightly different situation—that of a viewer with an inferred age outside of the required age interval. As illustrated by the membership function, as the viewer age moves away from the identified targeting age interval, the membership function drops off quickly. In this case, viewer 3 has a compatibility of only 0.18, indicating that it would normally be a poor candidate for an ad with a 24-42 age requirement. It is noted, however, that the fuzzy compatibility mechanism means that the classifier can find and rank a viewer if any viewer exists.

In summary, a matching algorithm may involve the following steps. First, an ADR is received from matching to one or more of the identified viewers. The similarity function is applied with respect to each parameter, and the results are aggregated as discussed above in order to determine a degree of match. Once the classifier has discovered one or more viewers that match the basic targeting parameters of the ad, the classifier determines whether or not any of these viewers are currently watching the television set. To do this, the periodicity analysis function is called to match a week by day and week by time of day terrain surface to the required time. This process returns a value reflecting the expected degree of match between the viewing time behavior of each viewer and the time frame of the ad. The degree of match in this regard is used to scale the base compatibility score to produce a time compatibility score. Once the classifier has thus identified a set of compatible viewers and determined which of these viewers are currently watching the television (that is, the time compatibility value is greater than some threshold), the classifier determines whether or not to accept this ad (vote for the ad or select the ad for delivery) based on any frequency limitation constraints and also subject to consideration of ad importance. That is, there may be additional constraints associated with the ad regarding the frequency with which the ad may be delivered to an individual viewer or the total number of times that the ad may be delivered to a viewer. The frequency analyzer returns a value and range of zero to one that is used to scale the time compatibility rank. This creates a frequency compatible rank. In the case of ad importance, a first ad may be selected (and voted) rather than a second ad, where the ads have a similar degree of "match" or even where the second ad has a better match, due to differences in ad importance (e.g., where the first ad has a higher importance).

An ad may also have constraints. For example, the ad may have target age limitations, genre restrictions, network restrictions, program nature restrictions, rating restrictions or the like. The placement constraint analyzer that meets the above-noted compatibility requirements and then searches for any required placement constraints. The placement analysis returns a gateway value of one or zero where one indicates no active placement constraints and zero indicates placement constraints that are violated. This creates the final compatibility index score.

It will be appreciated that the matching process need not be based on a continuous, or even finely graded, value range. For example, the result of the matching process may be a binary "match" or "no match" determination. In this regard, a threshold, or set of thresholds with associated decision logic, may be used to define a match or lack thereof for an ad with respect to a current audience.

As shown in FIG. 10, the classifier may thus be viewed as incorporating a number of functional components including a stay transition and link manager, a feature acquisition subsystem, a mountain clustering subsystem, periodicity analysis subsystem and an ad matching and ranking subsystem. The stay transition and link manager are operative to monitor the click stream and determine whether the DSTB is turned on as well as tracking stay changes. The feature acquisition subsystem is operative to build the initial feature terrain as discussed above. The mountain clustering subsystem is operative to process the feature terrain to remove noise and better define viewer sites as discussed above. The periodicity analysis subsystem recognizes viewing patterns and matches those patterns to viewers as identified from the processed feature terrain space. Finally, the ad matching and ranking subsystem compares viewer classification parameters to targeting parameters of an ad and also analyzes viewing habits of the viewer in relation to the delivery time, so as to match ads to viewers and develop a ranking system for voting, ad selection and reporting.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. For example, although fuzzy sets and fuzzy rules are described in connection with various processes above, aspects of the present invention can be implemented without fuzzy data sets or rules. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:

1. A method for use in targeting assets in a broadcast network, comprising the steps of:
   identifying an asset having a target audience defined by one or more targeting parameters;
   first using a machine learning tool to develop classification information for one or more users of a user equipment device audience; and
   second using the machine learning tool to match said identified asset to a current user of said user equipment device; wherein said step of second using comprises using fuzzy logic to determine a level of correspondence between user classification parameters of said user and said targeting parameters of said asset.

2. A method as set forth in claim 1, wherein said step of second using comprises using fuzzy logic to define a classification parameter of said current user.

3. A method as set forth in claim 1, wherein said step of first using involves identifying user inputs, associating said user inputs with values related to classification parameters and treating said values as points in fuzzy sets.

4. A method as set forth in claim 3, wherein said step of first using comprises monitoring a number of user inputs to aggregate evidence in a first fuzzy set.

5. A method as set forth in claim 4, wherein said first using involves multiple dimensions related to multiple classification parameters and said aggregated evidence is used to define one or more features of a multidimensional feature terrain.

6. The method as set forth in claim 5, wherein said feature terrain is developed so as to reflect differences in classification parameters in relation to time.

7. The method as set forth in claim 6, wherein said evidence is aggregated on a time dependent basis.

8. The method as set forth in claim 6, wherein first evidence for a first time of day is aggregated at a terrain location different than second evidence for a second time of day as a function of a difference in time of day.

9. A method as set forth in claim 5, wherein said step of first using further comprises reducing noise in said multidimensional feature terrain.

10. The method as set forth in claim 9, wherein said reducing noise comprises processing evidence in relation to reference values to reduce noise.

11. The method as set forth in claim 10, wherein individual items of evidence are compared to said reference values to qualify said items for use in developing said multidimensional feature terrain.

12. A method as set forth in claim 5, wherein said step of first using further comprises reducing a set of gradients across the multidimensional feature terrain.

13. A method as set forth in claim 5, wherein said step of first using comprises using fuzzy logic to cluster features of said multidimensional feature terrain.

14. A method as set forth in claim 5, further comprising using said one or more features to determine one or more classification parameters of said user.

15. A method as set forth in claim 3, wherein said user inputs are remote control inputs.

16. A method as set forth in claim 1, wherein said step of second using comprises using fuzzy logic to develop a characterization of an audience of a network programming event.

17. A method as set forth in claim 16, wherein a demographic profile of said audience is associated with a series of fuzzy numbers.

18. A method as set forth in claim 16, wherein said characterization is matched to determine classification parameters of a user.

19. A method as set forth in claim 18, wherein a congruence similarity function is used to match said characterization to said classification parameters.

20. A method as set forth in claim 1, further comprising the step of determining whether said user equipment device is on.

21. A method as set forth in claim 1, further comprising the step of determining whether any user is present at said user equipment device.

22. A method as set forth in claim 1, further comprising the step of signaling said network based on said step of said matching.

23. A method as set forth in claim 22, wherein said step of signaling comprises providing an indication to the network regarding a suitability of said asset for said user.

24. A method as set forth in claim 22, wherein said step of signaling comprises providing information to the network regarding an asset delivered at said user equipment device.

25. A method for use in targeting assets in a broadcast network, comprising the steps of:
   receiving user inputs at a user equipment device; and
   analyzing the inputs to associate audience classification parameters with a user using fuzzy logic, wherein said fuzzy logic involves one of fuzzy sets and fuzzy rules; wherein said step of analyzing comprises identifying a user input, associating the input with a classification parameter of a current user and treating said input as a point in a frizzy set.

26. The method as set forth in claim 25, wherein said step of analyzing comprises obtaining targeting parameter information for an asset and using said targeting parameter information to define one or more fuzzy values.

27. An apparatus for use in targeting assets in a broadcast network, comprising:
   an interface for receiving user inputs at a user equipment device; and
   a processor for analyzing the inputs to associate audience classification parameters with the user using a machine learning tool, wherein the machine learning tool is operative to develop classification information for a plurality of users of a user equipment device audience and to identify a current user of said user equipment device.

28. The apparatus as set forth in claim 27, wherein said machine learning tool receives user input information, associates classification information with user inputs to develop evidence, aggregates the evidence over multiple inputs and processes the inputs to distinguish said plurality of users.

29. The apparatus as set forth in claim 28, wherein said evidence is aggregated on a time dependent basis.

30. The apparatus as set forth in claim 27, wherein said machine tool identifies said current user by matching current inputs to classification information developed for one of said plurality of users.

31. The apparatus as set forth in claim 27, wherein said user equipment device is further operative for signaling a separate platform of said network based on identification of said current user.

32. A method for use in targeting assets in a broadcast network, comprising the steps of
developing a model of a network user based on user inputs free from persistent storage of a profile of said user; and
using the model of the network user in targeting assets to the user; wherein said step of developing comprises operating a machine learning tool to receive inputs from a plurality of users over time, associating said inputs with user classification information to develop evidence and processing said evidence to provide said model of said network user; wherein said machine learning tool progressively develops the model after each user input.

33. The method as set forth in claim 32, wherein said step of using comprises matching evidence concerning a current user to said model.

34. The method as set forth in claim 33, further comprising the step of selecting an asset for delivery based on said matching.

35. A method for use in targeting assets in a broadcast network, comprising the steps of:
determining, at a user equipment device, user information regarding a user of said user equipment device based at least in part on user inputs to said user equipment device using a machine learning tool; and
signaling said broadcast network based on the user information; wherein said step of signaling comprises providing an indication to the network regarding a suitability of an asset for said user.

36. The method as set forth in claim 35, wherein said step of signaling comprises providing information to the network regarding an asset delivered at said user equipment device.

37. An apparatus for use in targeting assets in a broadcast network, comprising:
a processor associated with a user equipment device operative for determining information regarding a user of said user equipment device based at least in part on user inputs to said user equipment device using a machine learning tool; and
an interface, operatively associated with the processor, for use in signaling said broadcast network based on the user information; wherein said interface is used to provide information to the network regarding an asset delivered at said user equipment device.

38. The apparatus as set forth in claim 37, wherein said interface is used to provide an indication to the network regarding a suitability of an asset for said user.

* * * * *

UNITED STATES PATENT AND TRADEMARK OFFICE
CERTIFICATE OF CORRECTION

PATENT NO. : 7,698,236 B2
APPLICATION NO. : 11/743544
DATED : April 13, 2010
INVENTOR(S) : Cox et al.

It is certified that error appears in the above-identified patent and that said Letters Patent is hereby corrected as shown below:

Column 34, line 32, delete "on", and insert therefor --"on"--.
Column 34, line 54, delete "frizzy", and insert therefor --fuzzy--.

Signed and Sealed this

First Day of June, 2010

David J. Kappos
*Director of the United States Patent and Trademark Office*